US012487227B2

(12) United States Patent
Luloff et al.

(10) Patent No.: US 12,487,227 B2
(45) Date of Patent: Dec. 2, 2025

(54) DEEP ELECTROMAGNETIC REBAR PROBE

(71) Applicant: ATOMIC ENERGY OF CANADA LIMITED/ÉNERGIE ATOMIQUE DU CANADA LIMITÉE, Chalk River (CA)

(72) Inventors: Mark Stephen Luloff, Chalk River (CA); Molly Zaugg, Chalk River (CA); Steven Hogg, Chalk River (CA); Jia Lei, Chalk River (CA)

(73) Assignee: ATOMIC ENERGY OF CANADA LIMITED/ÉNERGIE ATOMIQUE DU CANADA LIMITÉE, Chalk River (CA)

( * ) Notice: Subject to any disclaimer, the term of this patent is extended or adjusted under 35 U.S.C. 154(b) by 1 day.

(21) Appl. No.: 18/028,734

(22) PCT Filed: Sep. 28, 2021

(86) PCT No.: PCT/CA2021/051348
§ 371 (c)(1),
(2) Date: Mar. 27, 2023

(87) PCT Pub. No.: WO2022/061475
PCT Pub. Date: Mar. 31, 2022

(65) Prior Publication Data
US 2023/0366870 A1    Nov. 16, 2023

Related U.S. Application Data

(60) Provisional application No. 63/084,113, filed on Sep. 28, 2020.

(51) Int. Cl.
*G01N 33/38*    (2006.01)
*G01B 7/12*     (2006.01)
(Continued)

(52) U.S. Cl.
CPC .............. *G01N 33/383* (2013.01); *G01B 7/12* (2013.01); *G01B 7/26* (2013.01); *G01N 17/006* (2013.01); *G01N 27/9046* (2013.01)

(58) Field of Classification Search
CPC ............. G01M 5/0008; G01M 5/0083; G01M 5/0041; G01M 5/0091; G01N 33/383;
(Continued)

(56) References Cited

U.S. PATENT DOCUMENTS

| 4,837,509 A | 6/1989 | Dodmann et al. |
| 5,259,944 A * | 11/1993 | Feliu ...................... G01N 17/02 204/404 |

(Continued)

FOREIGN PATENT DOCUMENTS

| CN | 113984881 A | 1/2022 |
| CN | 108614032 B | 6/2022 |

(Continued)

OTHER PUBLICATIONS

International Preliminary Report on Patentability for PCT/CA2023/050400, mailed Sep. 24, 2024.
(Continued)

*Primary Examiner* — Vinh P Nguyen
(74) *Attorney, Agent, or Firm* — Joseph C. Zucchero; Carolyn S. Elmore; Elmore Patent Law Group, P.C.

(57) ABSTRACT

A non-destructive method for determining at least one of a cover depth and a cross-sectional area of at least a first ferrous rebar that is within a non-magnetic can include the steps of: a) establishing an electromagnetic circuit comprising the first ferrous rebar, an electromagnetic coupler, a first transmitter and a first receiver; b) introducing a first pulsed electromagnetic interrogation signal along the electromagnetic circuit; c) receiving a response electromagnetic signal having first magnitude that is induced in the first ferrous (Continued)

rebar and generating a corresponding response electrical signal; d) determining at least one of the cover depth and the cross-sectional area of the first ferrous rebar based on time information and the voltage information and generate a corresponding first output signal using a response signal processor; e) providing a first user output based on the output signal using a user output module.

23 Claims, 19 Drawing Sheets

(51) Int. Cl.
*G01B 7/26* (2006.01)
*G01N 17/00* (2006.01)
*G01N 27/90* (2021.01)

(58) Field of Classification Search
CPC ..... G01N 27/4035; G01N 2291/02854; G01N 17/00; G01N 17/02; G01N 27/02; G01N 29/2412; G01N 27/9046; G01N 17/04; G01N 17/006; G01D 21/00; G01D 5/48; G01R 27/00; G01R 27/2641; G01B 7/12; G01B 7/26; G01V 3/088; G01V 3/12
See application file for complete search history.

(56) References Cited

U.S. PATENT DOCUMENTS

| | | | |
|---|---|---|---|
| 5,339,023 A | 8/1994 | Kruchowy et al. | |
| 5,446,379 A | 8/1995 | Machi | |
| 6,291,992 B1 | 9/2001 | Van Andel et al. | |
| 6,586,938 B1 | 7/2003 | Paltoglou | |
| 9,176,108 B2* | 11/2015 | Kwun | G01N 29/11 |
| 9,638,652 B2* | 5/2017 | Ghods | G01N 27/02 |
| 9,816,978 B2* | 11/2017 | Bartholomew | G01N 33/383 |
| 2015/0362422 A1* | 12/2015 | Mazzeo | G01N 27/20 |
| | | | 324/238 |
| 2017/0153356 A1 | 6/2017 | Zibold | |
| 2017/0168016 A1 | 6/2017 | Hardy et al. | |
| 2020/0124550 A1* | 4/2020 | Demuth | G01B 7/003 |

FOREIGN PATENT DOCUMENTS

| | | |
|---|---|---|
| EP | 0027368 A2 | 4/1981 |
| JP | 2007033145 A | 2/2007 |
| WO | 2022061475 A1 | 3/2022 |

OTHER PUBLICATIONS

International Search Report and Written Opinion issued for PCT/CA2021051348, mailed Dec. 29, 2021.

International Search Report and Written Opinion issued for PCT/CA2023/050400, mailed Jun. 13, 2023.

Supplementary European Search Report for Application 21870655 dated Sep. 27, 2024.

Eddy, I. C, et al., "Pulsed eddy current respone to liftoff in different sizes of concrete embedded rebar", IEEE Sensors, doi: 10.1109/SENSORS43011.2019.8956833, 2019, 1-4.

* cited by examiner

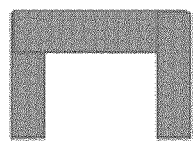
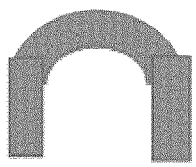
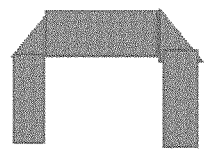
Figure 13a          Figure 13b          Figure 13c
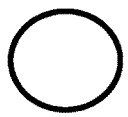
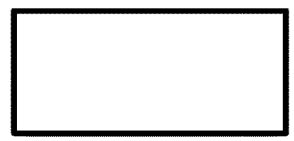
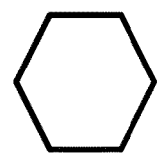
Figure 14a      Figure 14b      Figure 14c      Figure 14d

DEEP ELECTROMAGNETIC REBAR PROBE

CROSS-REFERENCE TO EARLIER APPLICATION

This application claims the benefit U.S. Provisional Application No. 63/084,113 filed Sep. 28, 2020 and entitled Deep Electromagnetic Rebar Probe, the entirety of which is incorporated herein by reference.

FIELD

In one of its aspects, the present disclosure relates generally to an apparatus and methods for the non-destructive testing of ferrous objects embedded within a non-ferrous material and more particularly to the determination of the position, form, orientation, distance of rebar below the surface of the concrete (cover depth), and the diameter of carbon steel reinforcement embedded in concrete.

BACKGROUND

U.S. Pat. No. 4,837,509 discloses a method and apparatus for measuring the overlayer of a nonmagnetic material such as concrete and the diameter of steel reinforcement bars embedded therein. A steady state magnetic flux field is generated in the area of the concrete which is to be tested. A reinforcement bar embedded within the concrete generates a scattered field which is superimposed on the excitation field. By scanning the concrete surface, an amplitude locus is determined which is subtracted from an amplitude locus determined in the absence of ferromagnetic objects, whereby a difference locus is obtained. The concrete overlayer and the diameter of the steel reinforcement bar are determined from the location and magnitude of the maximum values of the difference locus with the aid of an evaluation computer.

U.S. Pat. No. 5,339,023 discloses a measuring apparatus which accurately locates reinforcing bars in underwater concrete structures such as piers, retaining walls, easements and the like and measures the amount of concrete covering each reinforcing bar. The measuring apparatus includes a probe which generates a magnetic field and which is moved over the surface of the underwater concrete structure under test. When the poles of the magnetic field are in parallel alignment with and directly over a reinforcing bar within the structure a disturbance occurs in the magnetic field with the magnitude of the disturbance being indicative of the depth of concrete covering the reinforcing bar. An electronics module electrically coupled to the probe provides an analog output signal which is indicative of the distance between a reinforcing bar within the concrete structure under test and the probe. This analog signal is supplied to a meter which provides a visual indication of the location of the reinforcing bar and a microprocessor which then calculates the depth of the reinforcing bar within the concrete structure.

U.S. Pat. No. 5,446,379 discloses a system for searching and sensing reinforcing steel in reinforced concrete is provided. The system comprises a means for magnetizing the reinforcing steel in the reinforced concrete with lines of magnetic force generated by a magnetic field and a means for sensing the lines of magnetic force radiated from the magnetized reinforcing steel to detect an existence and a condition of the reinforcing steel in the reinforced concrete. The sensing means includes a coil for sensing a magnetic force and the magnetizing means is positioned remote from the sensing means.

SUMMARY

Reinforced concrete is a heterogeneous material in which concrete is cast around a network of reinforcing members, such as steel reinforcement known as rebar. This can be done for a variety of reasons, including because concrete without reinforcement does not tend to bear or endure tensile stresses that could lead to cracking. In certain situations, the rebar is vulnerable to corrosion during its lifetime in use and these products of corrosion have a relatively larger volume than the uncorroded steel. The accumulation of these corrosion products, and resulting expansion of the rebar volume may eventually lead to cracking, spalling or delamination of the concrete. In addition to compromising the integrity of the structure, the exposing of the rebar accelerates the propensity of the environment to further degrade the rebar. Therefore, it is desirable for owners and users of reinforced concrete structures to have information pertaining to the corrosion status of the embedded rebar. A variety of screening systems and methods are currently known to obtain rebar corrosion information.

Visual inspection methods are a common and relatively simple method of identifying corrosion. Under this technique a worker simply visually inspects the exterior surface of the reinforced concrete structure for signs of corrosion such as cracking, spalling or delamination. These visual inspection methods can only locate corrosion/damage that has progressed to the stage where the external, visible portions of the concrete structure are showing damage, which can mean that a significant level of damage has occurred before it is detected and/or detectable.

Destructive coring is another known method used to identify corrosion. In this method holes are drilled into the reinforced concrete structure in order to either visually inspect portions of the interior of the concrete structure, including the visible portions of the embedded rebar and/or to obtain a sample of the concrete, rebar materials and/or corrosion products for analysis. However, coring methods of this type cause damage to the concrete structure when used. This can limit the frequency of coring testing and can have some detrimental effects on the aesthetics and/or mechanical properties of the concrete structure.

Owners and users of reinforced concrete structures can also use the known, half-cell potential method (ASTN C876-15 standard) for screening rebar for corrosion, which provides a probability of whether corrosion is taking place. This technique works by measuring the corrosion or open circuit potential of the steel bar and compares this measured value to a reference benchmark potential. This method requires a direct electrical connection between the instrument and the steel rebar which may necessitate a hole to be drilled into the concrete structure. Additionally, the ohmic resistance of the concrete can vary based, for example, on the moisture content in the concrete at any given time, which may be a source of significant error in the measurements taken using this method. Also, this method generally does not provide information about the corrosion rate. Additionally, this method provides no information on the amount of material loss that may have occurred.

A variety of other electrochemical means are also used to identify corrosion including potentiostatic polarization, galvanostatic pulse, potentiodynamic linear polarization resistance, and electrochemical impedance spectroscopy, but each have limitations.

Ground-penetrating radar is another known method of rebar detection. These systems send a high frequency (>10

MHz) electromagnetic wave at a target, and record the time of flight in the material to compute rebar characteristics.

Electromagnetic-based inspection technologies are also used to identify corrosion in rebar. A benefit of electromagnetic systems is that they are generally relatively insensitive to the material properties of concrete itself and other non-metallic materials that may be embedded in the concrete. For example, U.S. Pat. No. 4,837,509 describes the use of an electromagnetic probe as a means of detection and sizing of rebar diameters. This probe uses a single coil wrapped around a ferrite yoke to direct a magnetic field across the perpendicular cross-section of rebar and a hall-effect sensor is used to measure changes in the magnetic field resulting from the presence of rebar and changes in cover depth.

Current (conventional) eddy current systems such as those described in U.S. Pat. Nos. 5,339,023 and 5,446,379 apply one or several harmonic voltages to a coil to generate a time-varying magnetic field within the metallic test-piece. This magnetic field induces eddy currents in nearby electrical conductors, which weakens the source magnetic field. This weakening of the source magnetic field results in a measurable voltage signal in a nearby pickup coil, which contains information about the electrical, magnetic, and geometrical properties of the test-piece.

However, existing systems and methods of rebar detection in concrete or other non-metallic matrix materials, including those described herein, tend to suffer from a number of drawbacks which can limit their utility.

In particular, with visual inspection methods the corrosion must have reached a certain threshold before the visual signs begin to manifest. Moreover, the visual inspection method is very labor intensive and the quality of the inspection will vary depending on the inspector and their particular disposition, experience, judgement and/or skill. Moreover, visual inspection methods generally do not provide quantifiable information pertaining to the extent of corrosion or the rebar cover depth.

While the destructive coring method may provide information pertaining to the corrosion rate and cover depth, the destructive coring method is labor, time, and capital intensive, may weaken the structure being drilled into, and provides a spatial resolution that is practically limited by the number and location of the holes drilled.

Known electrochemical methods of rebar detection have limited spatial resolution, are relatively time-intensive, and generally require skilled labour to operate. Current electrochemical-based inspection techniques cannot provide any information on the remaining rebar.

In ground-penetrating radar systems the speed of the electromagnetic wave is proportionate to the moisture content of the concrete which can lead to significant errors in the estimated cover depth as the moisture content is both unknown and constantly changing.

Conventional eddy current systems employing one or more frequencies of excitation, such as those disclosed in U.S. Pat. Nos. 5,339,023 and 5,446,379 suffer from two fundamental main weaknesses as an inspection technique: (1) The strength of induced eddy currents may decay exponentially within the depth of the conductive test-piece and is inversely proportional to the frequency of excitation and (2) Non-desirable signal artefacts may occur due to variation in the relative positioning and orientation of the probe relative to the test piece.

In contrast, Pulsed Eddy Current Testing (PET) fundamentally differs from conventional eddy current testing due to the coils being excited by a voltage pulse rather than a harmonic voltage. According to the Fourier transform, any signal, including the voltage pulse train may be expressed as a series of sinusoidal components. This means that the voltage train applied to the PET probe intrinsically contains a spectrum of frequencies, allowing a simultaneous interrogation of the test-piece at these different frequencies. Due to the skin effect, each frequency of excitation has a different sensitivity to the inspection parameters. This means that the resulting PET signal expressed in terms of time represents the summation of all these frequency components, which themselves contain a substantial amount of information about the test-piece that could be achieved through conventional eddy current methods.

The teachings herein describe a new type of pulsed eddy current probe that can optionally be utilized for the simultaneous and relatively rapid measurement of rebar diameter and cover depth to help overcome at least some of the limitations of existing electrochemical techniques and existing eddy current systems.

The teachings described herein relate to the application of Faraday's law of induction by generating a magnetic field from one or two coils of wire carrying an electric current and imposing this source magnetic field into nearby conductors, which in the examples illustrated herein is a rebar that is buried in concrete, but could be used on other conductors in other applications. The magnetic poles of the transmit coils are preferably anti-aligned as described in the exemplary embodiments herein such that a magnetic circuit can be established in a suitable yoke structure that can support the magnetic fields, such as a C-shaped yoke and any ferromagnetic object that is axially aligned with the yoke. By Lenz's law, the rebar (or other magnetic object) may establish an opposing magnetic field to the source field through the generation of eddy currents in the rebar. In addition to weakening the source field, this secondary field can induce a voltage signal in one or two receive coils that are included as part of the systems and apparatuses described herein. Optionally, a plastic wear plate, or other suitable wear protection structure that does not materially interfere with the magnetic fields, can be positioned beneath the four coils on the measurement apparatus to help protect the yoke and coils from coming into direct contact with, and being damaged by, the relatively rough surface of the concrete during an inspection without materially interfering with the desired measurements. This approach may help facilitate the simultaneous and relatively rapid measurement of one or both of rebar diameter (which can also be referred to as a cross-sectional area) and cover depth, thereby helping to overcome at least some of the limitations of the existing electrochemical techniques.

In accordance with one broad aspect of the teachings described herein, a non-destructive method for determining at least one of a cover depth and a cross-sectional area of at least a first ferrous object, such as a length of rebar, that is within a non-magnetic structure and extends along a bar axis using a portable detection apparatus comprising an electromagnetic coupler extending in a coupler direction, a first transmitter and a first receiver. The method may include the steps of:
   a) establishing an electromagnetic circuit by positioning a portable detection apparatus adjacent a non-magnetic structure containing the first ferrous rebar so that the coupler direction is generally aligned with the bar axis, the electromagnetic circuit comprising the first ferrous rebar, the electromagnetic coupler, the first transmitter and the first receiver;
   b) introducing a first pulsed electromagnetic interrogation signal along the electromagnetic circuit and through the first ferrous rebar using the first transmitter, the first pulsed electromagnetic interrogation signal being based on a pulsed voltage electrical signal provided by an input signal generator;

c) receiving a response electromagnetic signal having first magnitude that is induced in the first ferrous rebar and generating a corresponding response electrical signal comprising time information and voltage information using the first receiver;

d) determining at least one of the cover depth and the cross-sectional area of the first ferrous rebar based on the time information and the voltage information and generate a corresponding first output signal using a response signal processor; and e) providing a first user output based on the output signal using a user output module, the first user output corresponding to the at least one of the cover depth and the cross-sectional area of the first ferrous rebar.

The method may include positioning the portable detection apparatus so that the coupler direction is substantially parallel to the bar axis.

The pulsed voltage electrical signal may include a square voltage waveform.

Step d) may include determining both the cover depth and the cross-sectional area of the first ferrous rebar using the response signal processor.

The response signal processor may be configured to simultaneously determine the cover depth and the cross-sectional area of the first ferrous rebar.

The first user output may correspond to the cross-sectional area of the first ferrous rebar. Determining the cross-sectional area may include determining a rate of change/slope of a voltage of the response electrical signal with respect to time and comparing the rate of change to a predetermined data set.

Determining the rate of change may include determining a slope (in db/s) of a plot of the amplitude of the logarithm of the voltage of the response electrical signal (db) with respect to time (s) and comparing the slope to predetermined calibration slope values associated with corresponding rebar areas.

Determining the cross-sectional area further may include determining an amplitude of the voltage of the response electrical signal comparing the amplitude to the predetermined data set.

The first user output may correspond to the cover depth of the first ferrous rebar. Determining the cover depth may include determining an amplitude of a logarithm of a voltage of the response electrical signal and comparing the amplitude to a predetermined data set.

Determining the amplitude of the logarithm of a voltage of the response electrical signal may include determining a y-intercept of a plot of the amplitude of the logarithm of the voltage of the response electrical signal (db) with respect to time (s) and comparing the y-intercept to predetermined calibration y-intercept values associated with corresponding cover depths.

Determining the cover depth further may include determining a rate of change/slope of a voltage of the response electrical signal with respect to time and comparing the rate of change to the predetermined data set.

The method may include introducing a second pulsed electromagnetic interrogation signal along the electromagnetic circuit and through the first ferrous rebar using a second transmitter connected to the electromagnetic coupler and configured to produce the second pulsed electromagnetic interrogation signal based on the pulsed voltage electrical signal provided by the input signal generator, whereby the response electromagnetic signal has a second magnitude that is greater than the first magnitude.

The method may include receiving the response electromagnetic signal that is induced in the first ferrous rebar using a second receiver attached to the electromagnetic coupler and wherein the response electrical signal is based on a combination of the time information and the voltage information generated by the first receiver and time information and voltage information generated by the second receiver.

The portable detection apparatus may be selectably configurable in: a first operating mode, in which only the first pulsed electromagnetic interrogation signal is introduced along the electromagnetic circuit; and a second operating modes in which the first and second pulsed electromagnetic interrogation signals are introduced simultaneously along the electromagnetic circuit.

The method may include alternating between the first and the second operating modes at a predetermined mode frequency.

The first transmitter may be positioned at a first end of the electromagnetic coupler and the first receiver is positioned at an opposing second end of the electromagnetic coupler, and wherein step a) comprises positioning both the first receiver and the first receiver proximate the non-magnetic structure.

Step a) may include positioning a first wear plate between the first transmitter and the non-magnetic structure and wherein the first electromagnetic interrogation signal passes through the first wear plate.

The method may include grasping the portable detection apparatus via a grip portion that is configured to be grasped by the hand of a user and repositioning the portable detection apparatus relative to the non-magnetic structure by hand.

The method may include calibrating the portable detection apparatus prior to step a). The calibrating may include: introducing a calibration electromagnetic signal into surface of a calibration jig including a plurality of calibration ferrous objects of known cross-sectional areas disposed at respective, known distances from the surface of the calibration jig; receiving a respective calibration response electromagnetic signal induced in each of the plurality of calibration ferrous objects, each calibration response electromagnetic signal comprising time information and voltage information; generating a calibration dataset based on the time information and voltage information from each calibration response electromagnetic signal; and generating a concordance between the time information and voltage information associated with the calibration response electromagnetic signal of each calibration ferrous object and the known cross-sectional area and distance from the surface to the respective calibration ferrous object.

The method may include generating a two dimensional polynomial of best fit in which the time information from each calibration response electromagnetic signal is a first independent variable; the voltage information from each calibration response electromagnetic signal is a second independent variable; and one of the known cross-sectional area and distance from the surface to the respective calibration ferrous object is a dependent variable.

The method may include:

a) moving the portable detection apparatus to a different, second position relative to the non-magnetic structure in which the coupler direction is generally aligned with a second bar axis of a second ferrous rebar within the non-magnetic structure to establish a second electromagnetic circuit comprising the second ferrous rebar, the electromagnetic coupler, the first transmitter and the first receiver;

b) introducing the first pulsed electromagnetic interrogation signal along the second electromagnetic circuit and through the second ferrous rebar using the first transmitter, the second pulsed electromagnetic interrogation signal being based on the pulsed voltage electrical signal provided by the input signal generator;

c) receiving a second response electromagnetic signal that is induced in the second ferrous rebar and generating a corresponding second response electrical signal comprising time information and voltage information using the first receiver;

d) determining at least one of the cover depth and the cross-sectional area of the second ferrous rebar based on the time information and the voltage information and generate a corresponding second output signal using the response signal processor; and e) providing a second user output based on the output signal using the user output module, the second user output corresponding to the at least one of the cover depth and the cross-sectional area of the second ferrous rebar.

The method may include separating the portable detection apparatus from the non-magnetic structure after completing steps a) to e).

In accordance with another broad aspect of the teachings described herein, a portable, non-destructive detection apparatus for determining at least a first attribute of an elongate, target object extending along an object axis and being disposed within a non-magnetic structure can include an input signal generator configured to generate a pulsed voltage electrical signal. An electromagnetic coupler may extend in a coupler direction between first and second coupler ends and being positionable proximate the non-magnetic structure. A first transmitter connected to electromagnetic coupler and configured to generate a first pulsed electromagnetic interrogation signal based on the pulsed voltage electrical signal. A first receiver may be connected to the electromagnetic coupler and may be spaced apart from the first transmitter. When the first and second coupler ends are positioned adjacent the non-magnetic structure and the coupler direction may be generally aligned with the object axis an electromagnetic circuit may be formed comprising the target object, the electromagnetic coupler, the first transmitter and the first receiver. The first transmitter is configured to introduce the first pulsed electromagnetic interrogation signal through the non-magnetic structure and along the electromagnetic circuit and the first receiver is configured to receive a response electromagnetic signal that is induced in the target object and to generate a corresponding response electrical signal comprising time information and voltage information. A response signal processor may be configured to process the response electrical signal to determine the first attribute of the target object based on the time information and the voltage information and generate a corresponding first output signal. A user output module may be configured to generate a first user output based on the first output signal.

A second transmitter may be connected to electromagnetic coupler and spaced apart from the first transmitter, and a second receiver may be connected to electromagnetic coupler and spaced apart from the second transmitter. The first and second coupler ends may be positioned adjacent the non-magnetic structure and the coupler direction may generally aligned with the object axis the second transmitter and second receiver at in the electromagnetic circuit. The second transmitter may be configured to introduce the second pulsed electromagnetic interrogation signal through the non-magnetic structure and along the electromagnetic circuit and the second receiver may be configured to receive the response electromagnetic signal that is induced in the target object and to generate a corresponding response electrical signal comprising time information and voltage information.

The first transmitter may be disposed toward the first coupler end and first receiver is disposed toward the second coupler end. When the first and second coupler ends are positioned adjacent the non-magnetic structure at least one of the first transmitter and the first receiver may be proximate non-magnetic structure.

The second transmitter may be disposed toward the second coupler end and the second receiver may be disposed toward the first coupler end. When the first and second coupler ends are positioned adjacent the non-magnetic structure at least one of the second transmitter and the second receiver may be proximate the non-magnetic structure.

The first transmitter may be at least partially nested within the second receiver.

The first transmitter may include at least one transmitter coil wrapped around the first coupler end. The second receiver may include at least one receiver coil that laterally surrounds the at least one transmitter coil.

The second transmitter may be at least partially nested within the first receiver.

The portable detection apparatus may be selectably configurable in: a first operating mode, in which only the first pulsed electromagnetic interrogation signal is introduced step a) along the electromagnetic circuit; and a second operating modes in which the first and second pulsed electromagnetic interrogation signals are introduced simultaneously along the electromagnetic circuit.

The first attribute may include at least one of: a) a representative cross-sectional area of the target object, wherein the response signal processor is configured to determine the first attribute based on a rate of change of a logarithm of a voltage of the response electrical signal with respect to time; and b) a representative depth of the target object from an outer surface of the non-magnetic structure, wherein the response signal processor is configured to determine the first attribute based on an amplitude of the logarithm of the voltage of the response electrical signal.

The response signal processor may be configured to determine a second attribute of the target object based on the time information and the voltage information and generate a corresponding second output signal, and wherein user output module configured to generate a second user output (light, sound, display, etc.) based on the second output signal.

The second attribute may include the other one of the representative cross-sectional area of the target object and the representative depth of the target object from an outer surface of the non-magnetic structure.

The response signal processor may be configured to determine the first attribute and second attribute simultaneously.

A first wear plate may be attached to the first end of the electromagnetic coupler for contacting the non-magnetic structure and disposed outboard of the first transmitter whereby when the apparatus is in use the first contact plate is disposed between the first transmitter and the non-magnetic structure.

A second wear plate may be attached to the second end of the electromagnetic coupler for contacting the non-magnetic structure and disposed outboard of the first receiver whereby when the apparatus is in use the second contact plate is disposed between the first receiver and the non-magnetic structure.

The electromagnetic coupler may include a ferrite yoke extending in the coupler direction.

The ferrite yoke may be a substantially linear portion extending along a linear yoke axis that is parallel to the coupler direction.

The ferrite yoke may be a first leg disposed at the first coupler end and extending transversely away from the liner portion and a second leg disposed at the second coupler end and extending transversely away from the liner portion, and wherein the first transmitter is mounted on the first leg and the first receiver is mounted on the second leg.

The pulsed voltage electrical signal may be a substantially square voltage waveform.

The apparatus may include a grip portion that is configured to be grasped by a hand of a user. The portable detection apparatus may be manipulable via the grip portion to position the first transmitter adjacent the non-magnetic material.

Other advantages of the present teachings may become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which:

FIGS. 13a-13c are schematic illustrations of different possible ferromagnetic yoke geometries;

FIGS. 14a-14d are schematic illustrations of different possible different possible ferromagnetic yoke cross sections

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
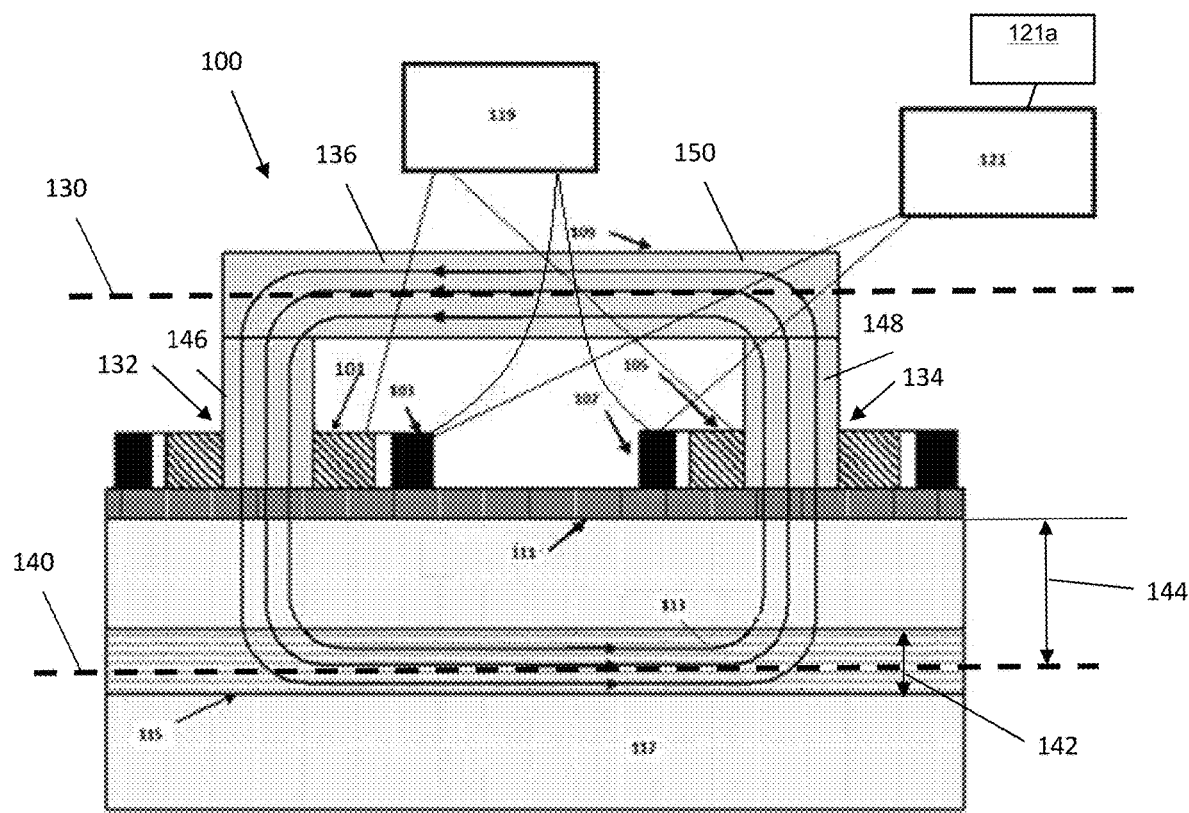
FIG. 1 is a schematic illustration of an embodiment of a deep electromagnetic rebar probe.

FIG. 1 is a schematic, cross-sectional representation of one example of a deep electromagnetic rebar probe 100 that can be used to determine at least one of the cover depth and the cross-sectional area of an elongate, magnetic and/or ferrous target object (such as a rebar) target object that is disposed within a non-magnetic structure or surrounding matrix material. In this example, the probe 100 includes an input signal generator, in the form of a pulsed eddy current generator 119, that is configured to generate a pulsed voltage electrical signal when the probe 100 is in use. The pulsed eddy current generator 119 can be connected to the other functional parts of the probe 100 using any suitable wires or other such connection.

An electromagnetic coupler in this example includes a yoke 109 that extends along a yoke axis 130 that also defines (and is parallel to) a coupler direction, between first and second coupler ends 132 and 134 that are axially spaced apart from each other. The yoke 109 is positionable proximate the non-magnetic structure that is to be measured/tested, illustrated as the non-ferrous concrete material 117 in this example. Optionally, at least some portions of the yoke 109 may also be configured to be graspable by a user so that the user can hold and manipulate the probe 100 when it is in use. More preferably, the probe 100 is configured (as illustrated in this example) to be a hand-held type of apparatus that can be grasped by one or two hands and that can be carried and moved by the user over and/or along the surface 111 to take the measurements as described herein. To help facilitate this, the yoke 109 in this example includes a grip portion 136 that is a portion of a main or central body portion of the yoke 109 and is axially spaced between the first and second ends 132 and 134, and the transmit and receive coils thereon. In this arrangement, the grip portion 136 includes the electromagnetically conductive material of the yoke 109 that can carry the electromagmetic flux 113 and forms part of the electromagnetic circuit of the probe 100. In other arrangements, a grip portion may be separate from the flux-carrying portion of the probe 100, and may be formed from a different material and/or located at a different position relative to the rest of the probe 100.

Preferably, the coupler/yoke 109 is shaped so that the electromagnetic circuit (e.g. flux lines 113) has a generally U or C-shaped configuration as shown in the illustrated examples (and see also FIGS. 13a-c), with a relatively large, axially extending central portion and inclined and/or orthogonal portions that are located toward the first and second ends 132 and 134.

A portion of a ferrous target object, in the form of a section of steel rebar 115 is shown as being positioned within the concrete structure 117 in this schematic example. The rebar 115 extends along, and defines an object or bar axis 140, has a width 142 or diameter in a direction that is orthogonal to the axis 140 and is located at a cover depth 144 below the surface 111 of the concrete structure 117.

The probe 100 in this example includes first and second transmitters in the form of a transmit coils 101 and 105 that are located at the first and second ends 132 and 134, respectively, that are connected to electromagnetic coupler and that can be used to generate respective first and second pulsed electromagnetic interrogation signals based on the pulsed voltage electrical signal received from the pulsed eddy current generator 119. As described herein, the pulsed eddy current generator 119 can be used to activate the transmit coil 101, the transmit coil 105 or optionally both transmit coils 101 and 105 simultaneously. While two transmitters are shown in this example, in other examples of the probes described herein the probe may include only one transmitter, such as transmit coil 101.

Similarly, in this example the probe 100 includes first and second receivers that are connected to an electromagnetic coupler that is provided in the form of the yoke 109 and are spaced apart from their associated transmitter, so that the first receiver is spaced from the first transmitter and the second receiver is spaced from the second transmitter. In this example, the first and second receivers include the receive coils 103 and 107 that are located at the first and second ends 132 and 134 of the yoke 109. In this arrangement, the receive coil 107 is associated with, and spaced from, transmit coil 101, and receive coil 103 is associated with and spaced from transmit coil 105.

In the example illustrated in FIG. 1, the yoke 109 includes first and second leg portions 146 and 148 that extend transversely outwardly from the central body portion 150 (downwardly as illustrated in FIG. 1), that also provides the grip region 136 in this example. The legs 146 and 148 help provide separation between the grip portion 136 and the surface 111, and also help provide space at the ends 132 and 134 to accommodate the coils 101, 105, 103, and 107 in their desired location and orientation (i.e. arranged in a plane that is generally parallel to the yoke axis 130 and that is generally orthogonal to the direction of the legs 146 and 148 about which they are mounted and wound).

In this illustrated configuration, when the first and second coupler ends 132 and 134 are positioned adjacent the non-magnetic structure 117 and the coupler direction 130 is generally aligned with the object axis 140 (as shown in FIG. 1) an electromagnetic circuit is formed comprising the target object (e.g. rebar 115), the electromagnetic coupler (e.g. yoke 109), the first transmitter (transmit coil 101) and the first receiver (receive coil 107). In this example, transmit coil 105 and receive coil 103 are also included in the electromagnetic circuit.

First transmit coil 101 includes a coil of electrically conductive wire which, when it receives the pulsed signal from the signal generator 119 will produce a corresponding pulsed electromagnetic interrogation signal through the non-magnetic structure 117 and along the electromagnetic circuit (e.g. flux lines 113) and the receive coil 107 includes a coil of electrically conductive wire that will receive a response electromagnetic signal that is induced in the target object 115 and will generate a corresponding response electrical signal that will include preferably both time information and voltage information.

The probe 100 also includes a suitable response signal processor, such as the processing unit 121 illustrated schematically in FIG. 1, that is configured to process the response electrical signal to determine at least one, and preferably more than one, attribute of the target object 115 (such as its width 142 or depth 144) based on the time information and the voltage information in the response electrical signal, as described herein. The processing unit 121 can then generate a corresponding first output signal that can be sent to a suitable user output module 121a, such as a computer, display screen, light, auditory transducer, or the like that is configured to generate a first user output based on the first output signal. The processing unit 121 is illustrated as being separate from the signal generator 119, but they may be incorporated into a single unit, and either, or both, of these functions can be performed by a suitable computer, signal generator, software running on a chip or other processor, firmware or hardware modules, including PLCs, microchips, integrated circuits and the like.

In this embodiment, the probe 100 is configured so that a magnetic circuit, shown using schematic flux lines 113, is established between transmit coils 101 and 105, ferromagnetic yoke 109, receive coils 103 and 107, and rebar 115 embedded in a non-ferrous material 117. Wear plate 111 physically separates transmit coils 101 and 105, ferromagnetic yoke 109, and receive coils 103 and 107 from the non-ferrous material 117 in order to protect coils 101, 105, 103, and 107 from the rough surface of the non-ferrous material 117 during a scan. A pulsed eddy current generator 119 is electrically coupled to transmit coils 101 and 105 and receive coils 103 and 107. In the illustrated embodiment the non-ferrous material is concrete. In other embodiments it could be other non-ferrous materials such as wood, cement, glass, dirt or plastic. In the illustrated embodiment the rebar 115 is comprised of carbon-steel. In other examples the rebar is comprised of iron or nickel or materials with both the product of relative permeability and conductivity within 2 orders of magnitude of carbon steel.

Pulsed eddy current generator 119 generates a pulsed voltage waveform that is applied to transmit coils 101 and 105. Preferably, the pulsed voltage waveform is a square voltage waveform or approximates a square voltage transform as the optimal configuration is to establish—for a short period of time—a constant magnetic circuit on the ON pulse and then subsequently observe the system response when the pulse is OFF. Pulsed eddy current generator 119 is further configured to receive and record a response signal from receive coils 103 and 107. This response signal will include time information and voltage information. Transmit coils 101 and 105 generate a pulsed magnetic field based on the pulsed voltage waveform supplied by pulsed eddy current generator 119.

Ferromagnetic yoke 109 directs the magnetic field from transmit coils 101 and 105 into the non-ferrous material 117 completing the magnetic circuit 113 between the transmit coils 101 and 105 and the sections of rebar 115 that are axially aligned, or at least generally aligned (e.g. +/−40 deg) with the probe. In general the ferromagnetic yoke 109 can have a number of different geometries. FIG. 13 illustrates 3 different examples of potential ferromagnetic yoke geometries that are acceptable and may be preferable in some examples. Other configurations are also possible. FIG. 14 illustrates 4 different examples of potential ferromagnetic yoke cross sections that are acceptable and may be preferable in some circumstances. Other configurations are also possible. The yoke 109 can be formed from any suitable material that has the desired mechanical and electromagnetic properties, and that can carry the magnetic field/flux 113 as described herein. Some examples of suitable materials include sintered ferrite or the laminated structures formed from ferromagnetic metal and non-conductive materials (such as those used in transformers), and the like.

Figure 2:
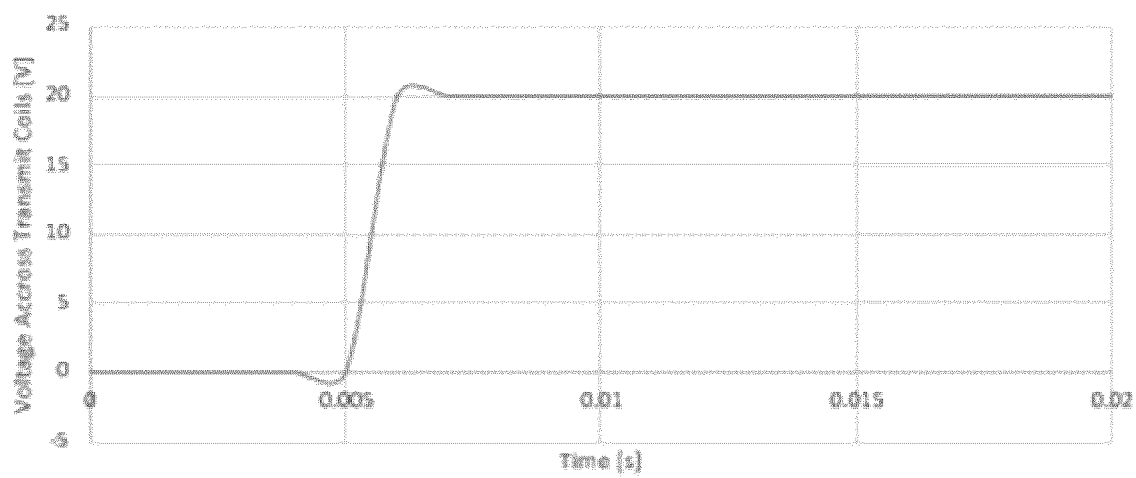
FIG. 2 illustrates one example of a pulsed voltage waveform that can be applied to the transmit coils of a deep electromagnetic rebar probe.
Figure 3:
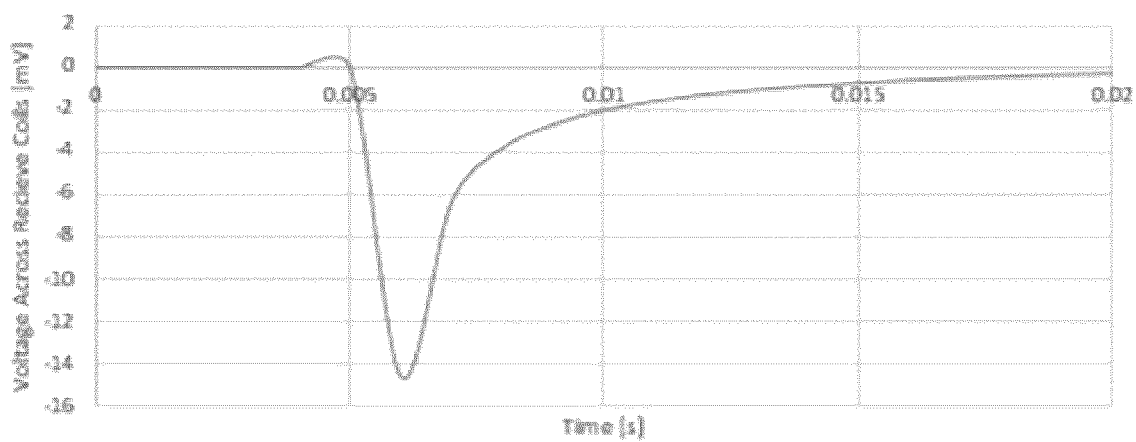
FIG. 3 illustrates one example of a voltage signal formed at the receive coils of a deep electromagnetic rebar probe.
Figure 4:
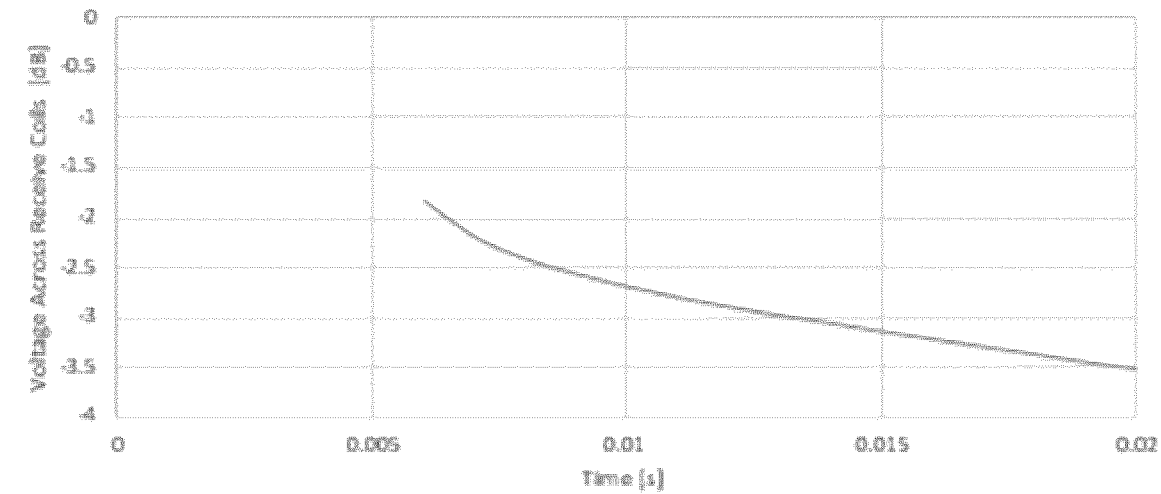
FIG. 4 illustrates logarithm of the voltage signal formed at the receive coils of a deep electromagnetic rebar probe.

When the pulsed voltage waveform is on, a voltage will form across the transmit coils 101 and 105 as illustrated in FIG. 2 and a source magnetic field is established in rebar 115 due to electromagnetic induction. As illustrated in FIG. 3, during the transition period between when the pulsed voltage waveform is on and off, a response signal is formed at receive coils 103 and 107 due on the interaction of the rebar 115 to the pulsed voltage waveform as per Faraday's law of induction. The absolute value of the voltage of the response signal quickly rises to a peak and then undergoes exponential decay as the magnetic field dissipates. As such, the logarithm of the signal seen voltage signal formed at receive coils 103 and 107 shows an initial peak followed by a linear decay as can be seen from FIG. 4.

The pulse train can, in some examples, be defined by the amplitude, frequency and pulse width. A pulse with a relatively larger amplitude can provide a relatively larger received signal, and therefore can be useful to help overcome noise in the system. In some of the examples described herein about 20V was sent through these coils. However, providing the system with a pulse having too large an amplitude (e.g. above a pre-determined use threshold) could, in some examples, cause the transmitter coils to get hotter than is desired. In general an appropriate amplitude for the pulse should be chosen to help provide a sufficiently high signal to noise ratio in the receive coils that can be achieved by the pulser instrumentation without causing excessive heating in the transmit coils that would compromise the practical use of the apparatus.

The frequency of the pulse is preferably selected so that is it long enough to allow the signal voltage to decay before the next pulse is applied. For example, a frequency can be selected that would allow at least 80 ms for the voltage to decay before the next pulse.

A relatively smaller/lower frequency (i.e. less pulses per unit of time) may help allow the user to get more of a decay trace to analyse, at the expense of less measurements. Preferably, the frequency of the pulse train should allow for an ample period of time for the voltage signal to decay between pulses while ensuring a practical number of measurements are taken based on the requirements of the inspection.

The pulse width is understood to mean the duration in which the pulse is "ON", which may affect the heating of the transmitter coils etc. The pulse width is preferably selected so that it can allow sufficient for the signal to decay however.

Figure 5:
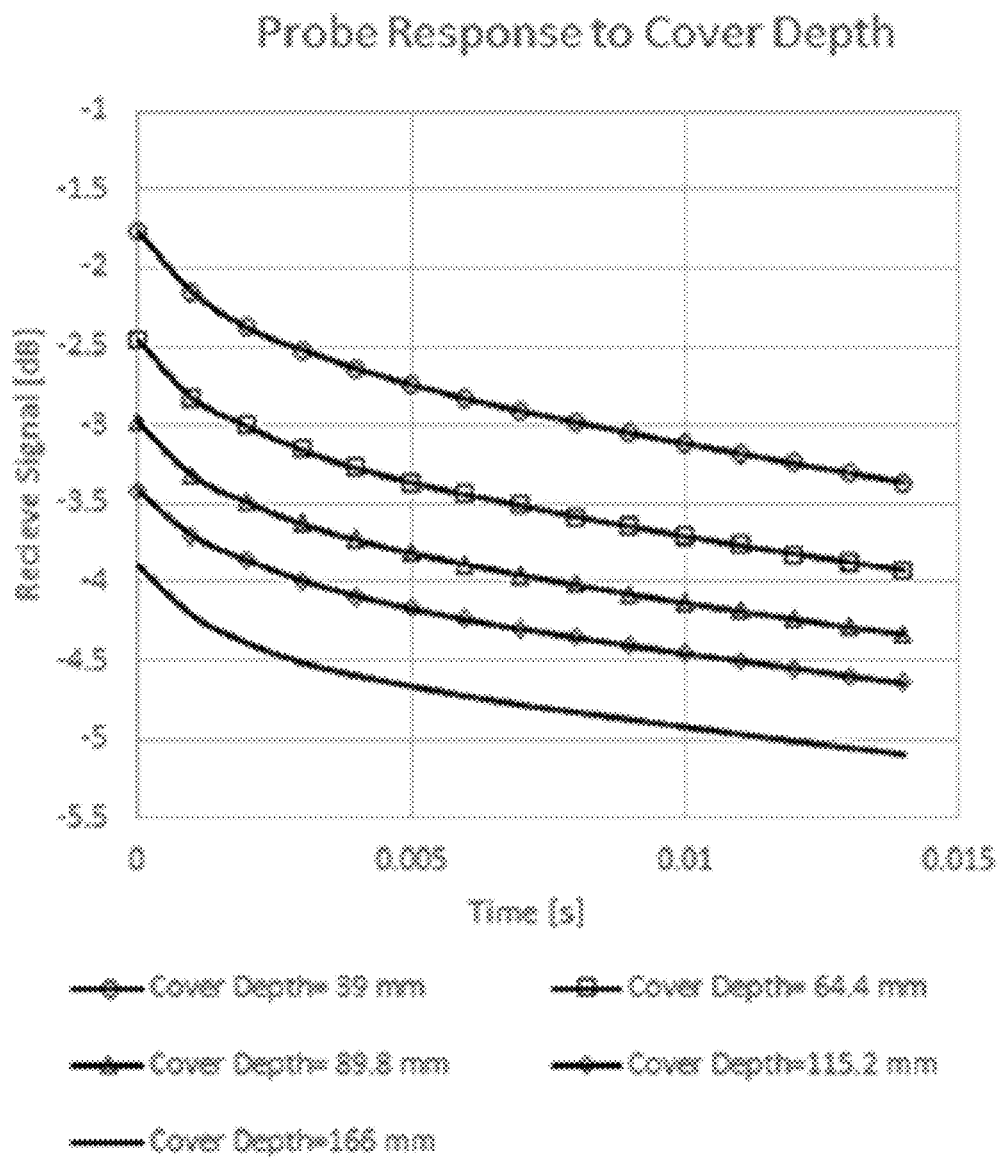
FIG. 5 illustrates the deep electromagnetic rebar probe's response to cover depth.

FIG. 5 illustrates how a change in the cover depth affects the amplitude of the logarithm of the voltage of the response signal formed at receive coils 103 and 107. In particular, FIG. 5 plots the strength of the voltage signal formed at receive coils 103 and 107 versus time with a variety of different cover depths. The various curves in FIG. 5 show that a change in the cover depth predominantly results in a vertical shift of the curves which provides a means to compute the cover depth from real inspection data.

Figure 6:
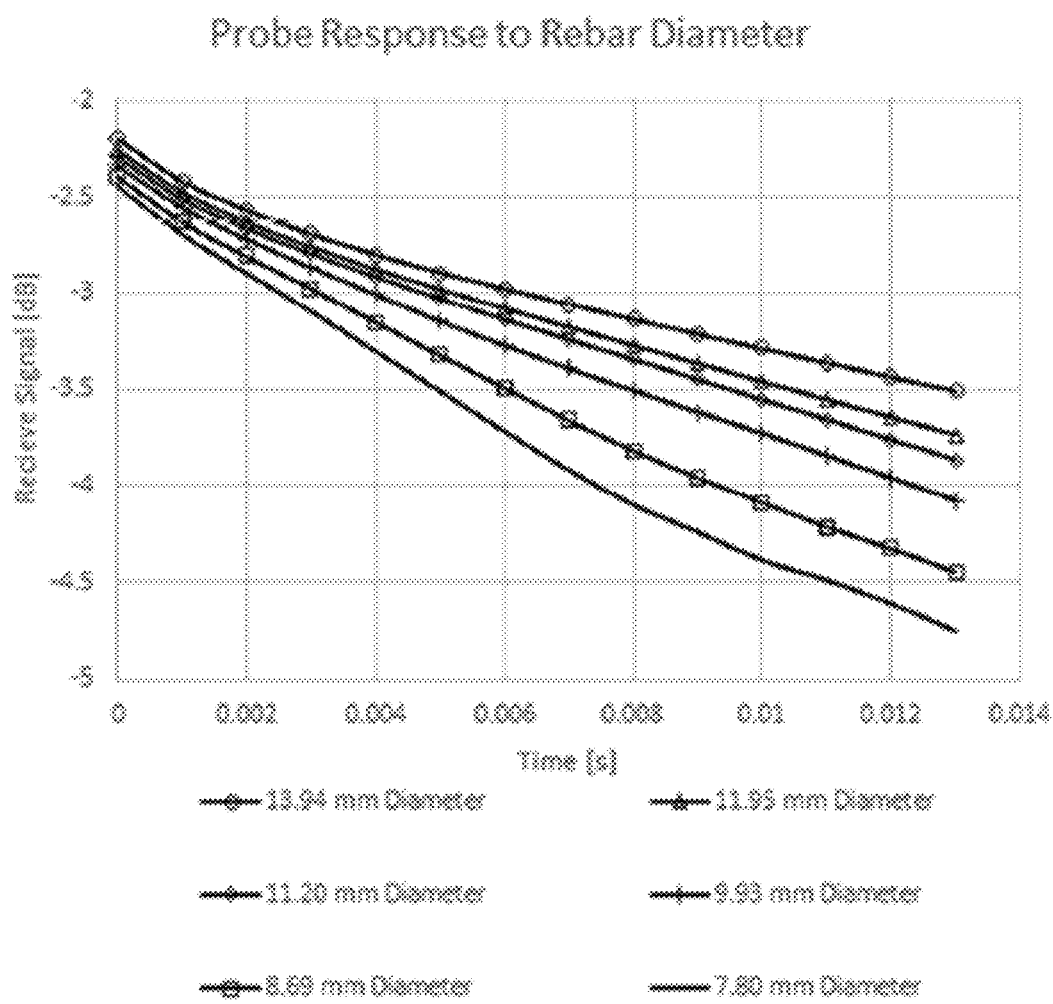
FIG. 6 illustrates the deep electromagnetic rebar probe's response to rebar diameter.

FIG. 6 illustrates how a change rebar diameter affects the amplitude of the logarithm of the voltage of the response signal formed at receive coils 103 and 107. In particular, FIG. 6 plots the strength of the voltage signal formed at receive coils 103 and 107 versus time with a variety of different rebar diameters. The various curves in FIG. 6 show that a change in the rebar diameter predominantly results in a change in slope of the curves which provides a means to compute the rebar diameter from real inspection data.

Optionally, the probes described herein can be configured to be operable in two or more different operating modes, in which different ones of the coils, or combinations of the transmit and receive coils are selectively activated. Operating different ones of the coils may change how the electromagnetic signals are generated and/or received, which may help facilitate the measurement of different features or aspects of the target object. For example, the deep electromagnetic rebar probe may be operated in a full transmit-receive mode in which both transmit coil 101 and transmit coil 105 are simultaneously triggered to generate the magnetic field in the buried rebar 115, and both receive coils 103 and 107 are in use. Optionally, the deep electromagnetic rebar probe may also be operable in one or more partially energized modes, which can be referred to here as solenoid modes, in which only one of the transmit coils 101 and 105 are in use at a time. For example, the deep electromagnetic rebar probe can be operable in a first solenoid mode in which only transmit coil 101 is energized to generate a magnetic field in the buried rebar 115, and therefore receive coil 107 is used to pick up the response signal, and/or may also be operable in a second solenoid mode in which only transmit coil 105 is energized to generate a magnetic field in the buried rebar 115, and therefore receive coil 103 is used to pick up the response signal.

When operating in a full transmit-receive mode the deep electromagnetic rebar probe may provide a relatively more accurate measurement of the bulk corrosion of the target rebar that is beneath the probe, as compared to modes in which only one transmit coil is used. This may be due to the transmit coils 101 and 105 having their magnetic fields anti-aligned to generate a magnetic circuit that remains stable in the presence of localized rebar corrosion. In this embodiment the two transmit coils 101 and 105 can optionally be configured to create an equal but opposite magnetic polarity. This can be done either by physically turning one of the coils upside down or interchanging the positive and negative leads of one of the coils. This embodiment of the deep electromagnetic rebar probe can be referred to as operating in a full transmit-receive mode.

Both receive coil 103 and receive coil 107 are each configured to receive a response signal. In some embodiments, or in some modes, only one of receive coils 103 and 107 may be used. In other embodiments the established voltage each of receive coils 103 and 107 may be added together which may confer the benefit of providing a relatively improved signal to noise ratio.

It has also been discovered that operating the probe 100 in either of the solenoid modes described above can change the nature of the electromagnetic field that is generated and the signals that are then received via the probe 100. It has also been discovered that recognizing the differences in the electromagnetic field that is generated and the signals that are then received via the probe 100 can be advantageously used, in some circumstances, to help a user/operator identify the presence of additional objects in the structure 117 that may be in proximity to the target object/rebar by recognizing the differences in the fields, and for example, that alternating between different ones of the operating modes may help a use identify the presence and location of rebar junctions within the structure 117 (e.g. locations where two or more rebars cross each other within the concrete). Therefore, in some embodiments of the methods and systems described herein, during the inspection the probe may be configured to cycle through one, two or three different modes of operation, these modes being: (1) both transmit coils 101 and 105 being triggered (full transmit-receive mode), (2) only transmit coil 101 being triggered (one solenoid mode), and (3) only transmit coil 105 being triggered (a second solenoid mode). This embodiment may confer the advantages of both of the two previously described embodiments. The changing of the operating modes may be done manually by a user or may be automatically triggered by a system controller or other suitable control mechanism.

Figure 17A:
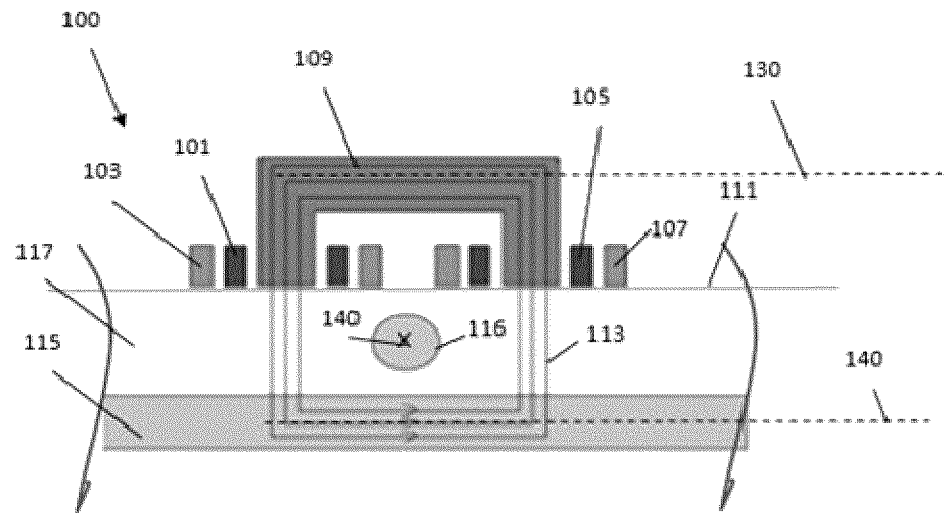
FIG. 17a is a schematic representation of a probe arranged above a first arrangement of a rebar intersection.
Figure 17B:
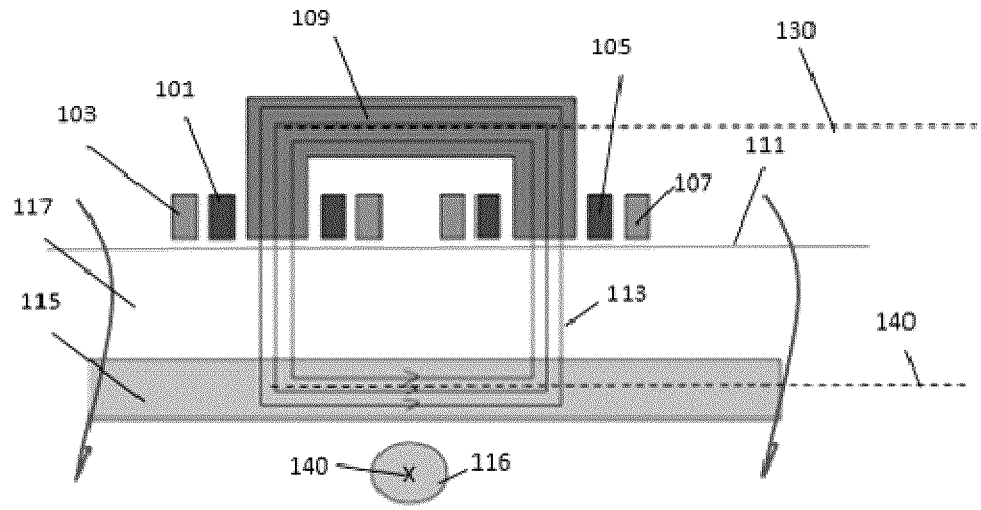
FIG. 17b is a schematic representation of a probe arranged above a second arrangement of a rebar intersection.

Referring also to FIGS. 17a and 17b, the deep electromagnetic rebar probe 100 is schematically illustrated above a concrete structure 117 that includes two buried rebars 115 and 116 that are arranged generally orthogonally to each other and each define respective object/rebar axes 140. This arrangement is fairly common in structures in which the rebars are arranged in a grid or mesh-type configuration. Determining the location of these intersection or overlap points may be useful in certain inspection and maintenance operations. In FIG. 17a, the perpendicular rebar 116 is positioned above the target rebar 115 (e.g. between the probe 100 and the rebar 115), while in FIG. 17b the perpendicular rebar 116 is positioned below the target rebar 115 (e.g. such that rebar 115 is between the probe 100 and the rebar 116).

As illustrated in FIGS. 17a and 17b, in this version of the full transmit-receive mode, both transmit coils 101 and 105 are active, each generating a magnetic field that is preferably anti-aligned with each other to create a magnetic circuit 113 within the yoke 109 of the probe 100 and within the axially aligned section of the rebar 115. The anti-alignment of the source magnetic field in this example coerces the field 113 to remain within the axial section of rebar 115 along the testing length, which may help produce a relatively strong resulting magnetic field that is not materially deterred and/or altered by the presence of a perpendicular section of rebar 116 above the axial section. However, if the perpendicular section of rebar 116 is situated below the axial section of rebar 115 (as shown in FIG. 17b), it is substantially shielded by the axial section 115 because the upper rebar 115 helps provide a magnetic path of least resistance. In this arrangement the perpendicular section 116 is very difficult to detect using the probe 100 as oriented in FIGS. 17a and 17b. However, if the probe 100 of FIG. 17b were rotated 90 degrees so as to be parallel to the axis 140 of rebar 116 and perpendicular to rebar 115, then the situation would resemble the schematic of FIG. 17a with the positions of the rebars 115 and 116 switched (i.e. with rebar 115 being considered the perpendicular rebar and being located above the target rebar 116). Therefore, it may be useful for the user to rotate the probe 100 while in use, optionally simultaneously with the alternating of the operating modes, to help the user locate both rebars 115 and 116, as well as the location of their intersection.

Figure 18A:
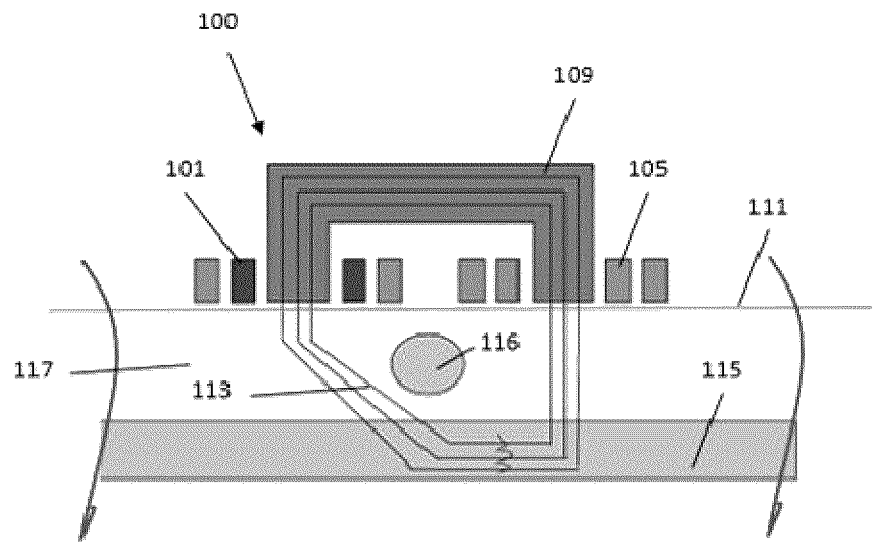
FIG. 18a is a schematic representation of a probe arranged above the rebar intersection of FIG. 17a and operating in a different operating mode.
Figure 18B:
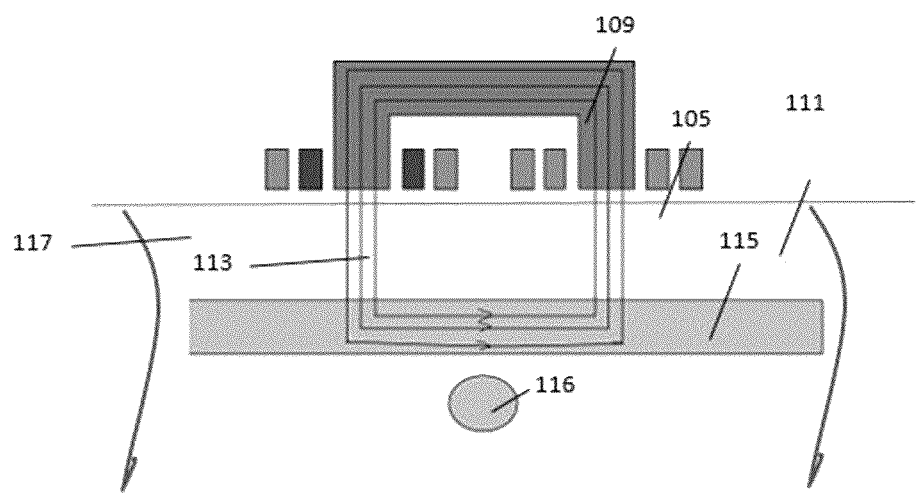
FIG. 18b is a schematic representation of a probe arranged above the rebar intersection of FIG. 17b and operating in a different operating mode.

Referring to FIG. 18a, the probe 100 is schematically illustrated as being in the same position as shown in FIG. 17a but being operated in a first alternative or solenoid mode in which transmit coil 101 is energized but transmit coil 105 is not. In this relatively lower power operating mode, the electromagnetic field 113 may tend to naturally follow a path of relatively lower resistance (as compared to the path in FIG. 17a) and the electromagnetic field 113 significantly weaker than the electromagnetic field 113 full transmit-receive mode of FIG. 17a and is therefore relatively easily swayed/influenced by the presence of the rebar 116 above the axial section of rebar 115. In contrast, when the rebar 116 is located below axial rebar 115 as shown in FIG. 18b the path of the electromagnetic field 113 is less influenced and may follow a path that is substantially similar to that shown in FIG. 17a.

Figure 19A:
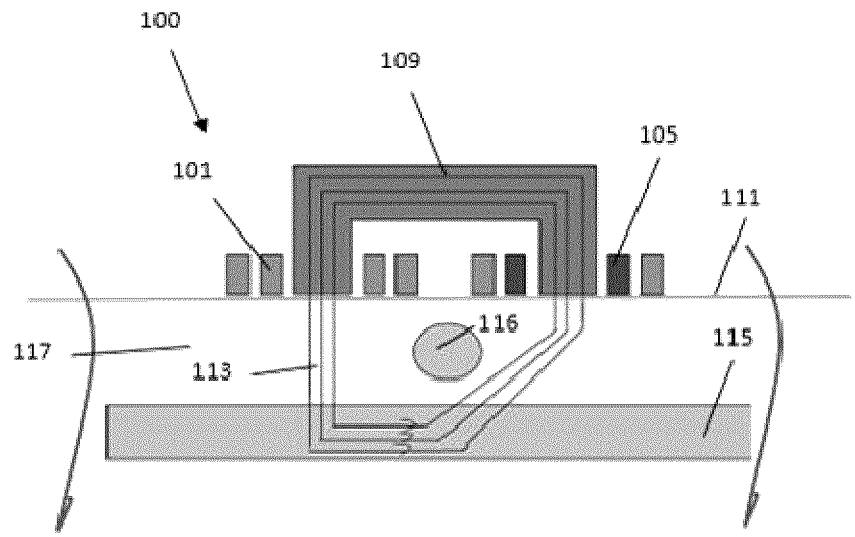
FIG. 19a is a schematic representation of a probe arranged above the rebar intersection of FIG. 17a and operating in a different operating mode.
Figure 19B:
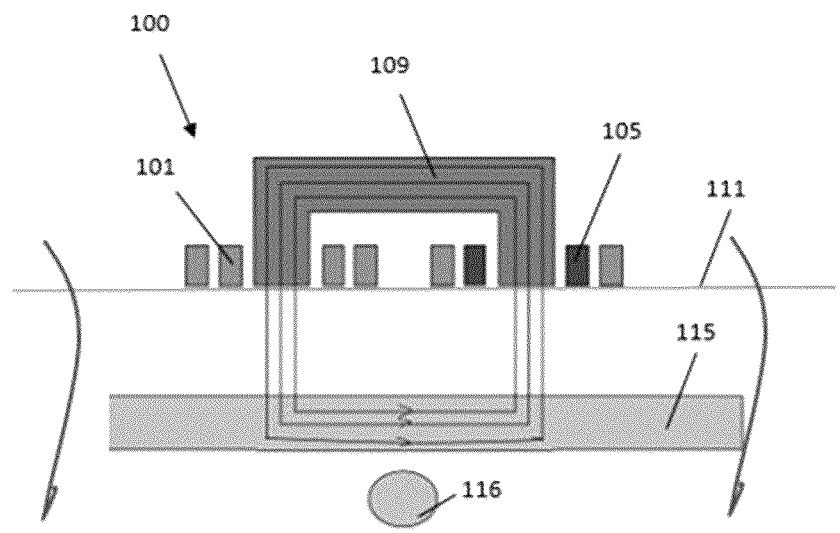
FIG. 19b is a schematic representation of a probe arranged above the rebar intersection of FIG. 17b and operating in a different operating mode.

Referring to FIG. 19a, the probe 100 is schematically illustrated as being in the same position as shown in FIG. 17a but being operated in a second alternative or solenoid mode in which transmit coil 105 is energized by transmit coil 101 is not. As in the first solenoid mode, when the rebar 116 is located above the rebar 115 (FIG. 19a) the path of the electromagnetic field 113 is influenced, and differs from the path of the electromagnetic field 113 in both the full transmit-receive mode (FIG. 17a) and the first solenoid mode (FIG. 18a). Alternatively, when the rebar 116 is below the rebar 115 its presence does not have a material effect on the path of the electromagnetic field 113.

Testing was conducted based on the schematics in FIGS. 17a-19b which demonstrated that utilizing the probe 100 as described herein could provide sufficient feedback to a user to enable them to determine the size and cover depth of the target rebar (such as a rebar 115) and also determine the location of an intersection between the two target objects (e.g. rebars 115 and 116 as illustrated). Several representative plots were prepared based on the laboratory testing measurements of scans along structures that contained known rebar junctions.

Figure 20:
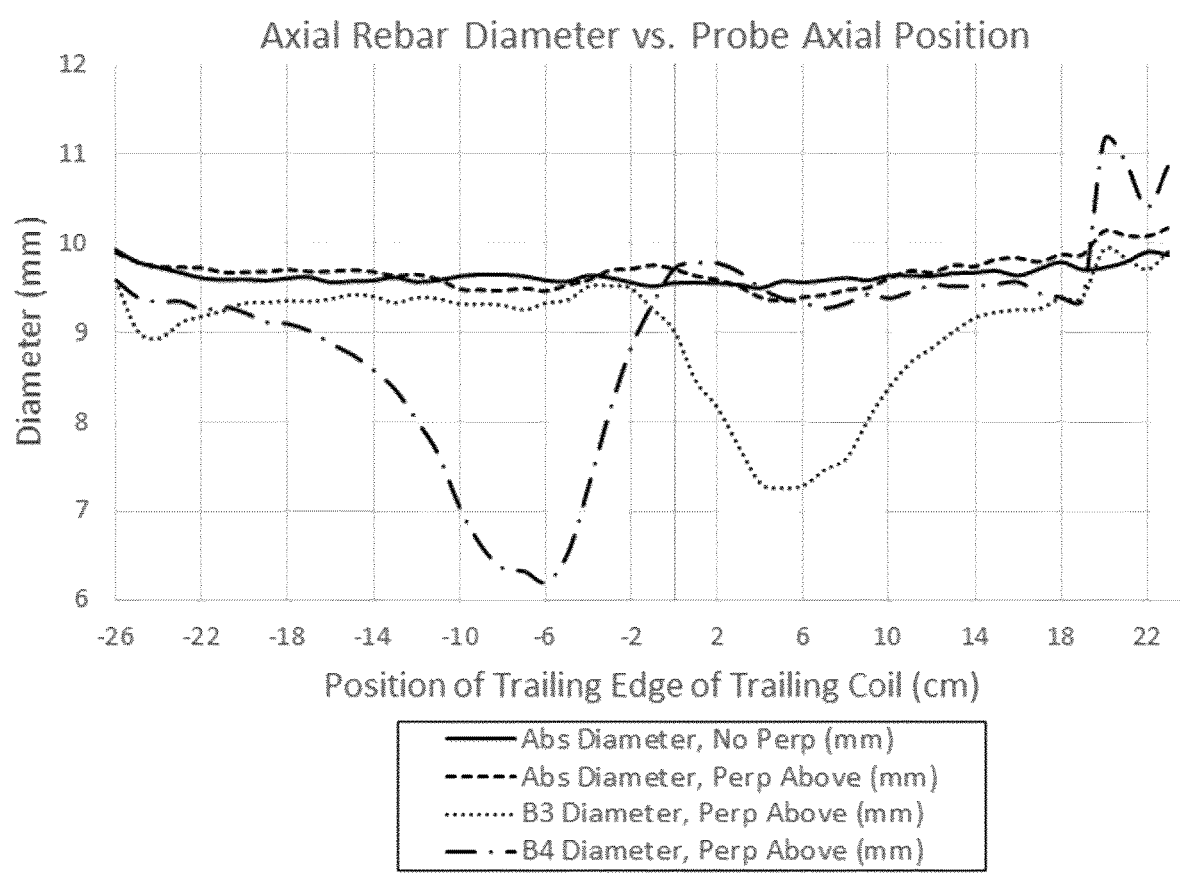
FIG. 20 is a plot showing returned rebar diameter vs probe axial position for a first test rebar arrangement.
Figure 21:
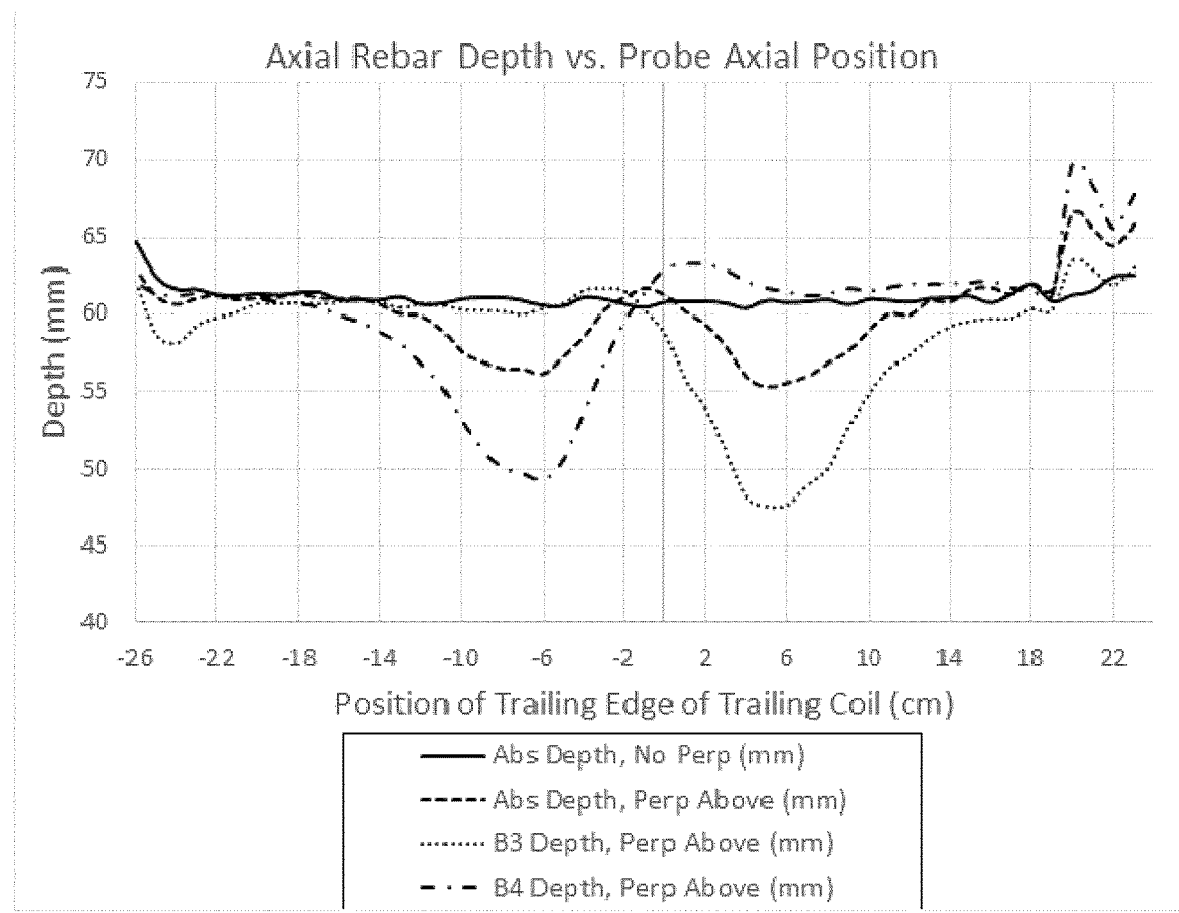
FIG. 21 is a plot showing returned rebar depth vs probe axial position for the first test rebar arrangement.

For example, FIG. 20 is a plot illustrating experimental data returned rebar diameter from the probe scanning a rebar junction similar to that illustrated in FIG. 17a. In this example, the perpendicular rebar section (e.g. the equivalent of rebar 116 as schematically illustrated) consists of unmachined 11 mm rebar above the axial section at axial location 0 cm. Channels B3 and B4 denote the measurements obtained with the probe in the first and second solenoid modes, while the Abs channels indicate measurements obtained with the probe operating in the full transmit-receive mode as described. Similarly, FIG. 21 is a plot showing experimental date for a returned cover depth from the probe scanning the rebar junction. The perpendicular rebar section 116 in these tests consists of unmachined 11 mm rebar located above the axial section of rebar 115 at axial location 0 cm. Again, channels B3 and B4 denote the measurements obtained with the probe in the first and second solenoid modes, while the Abs channels indicate measurements obtained with the probe operating in the full transmit-receive mode as described.

Figure 22:
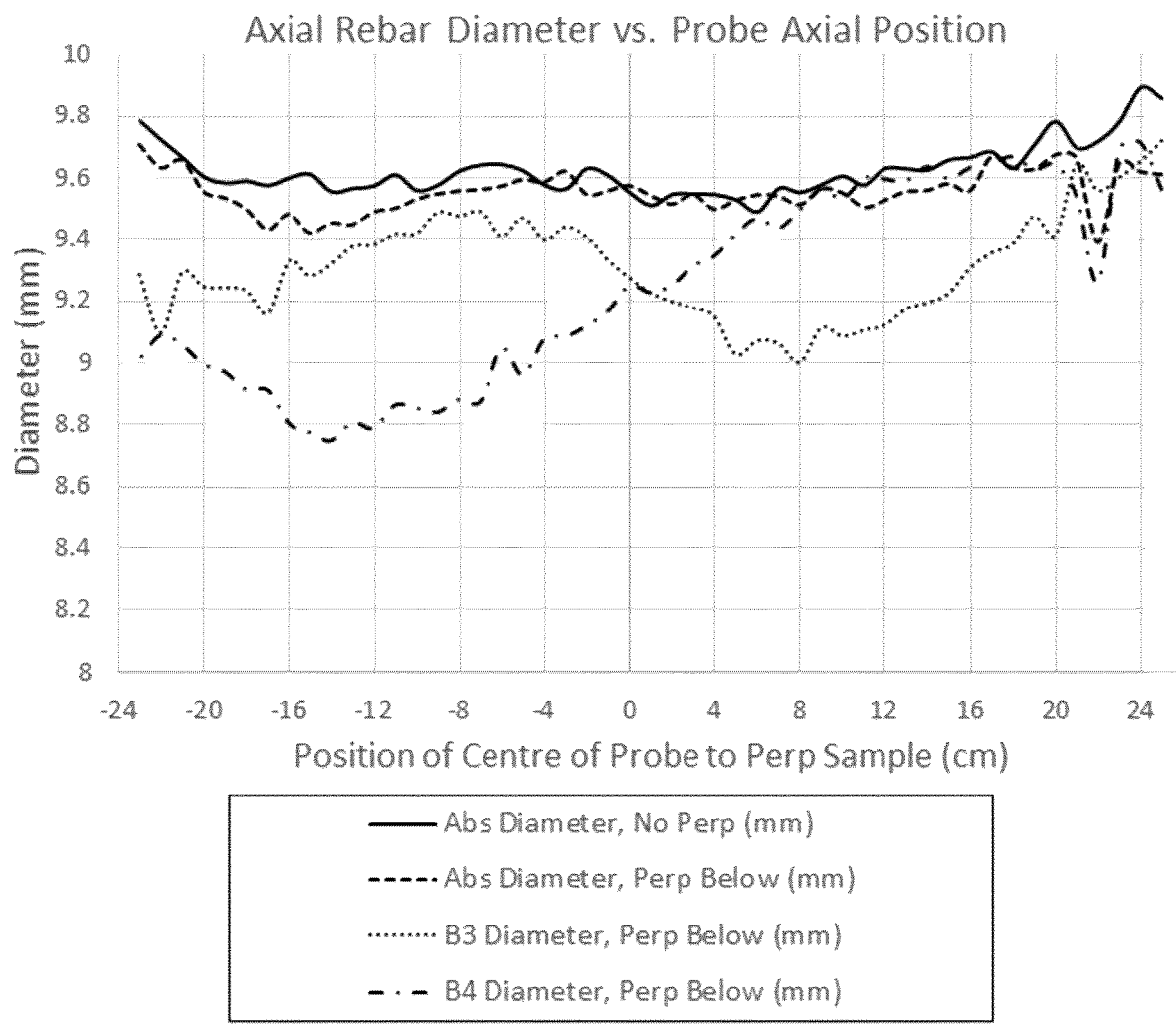
FIG. 22 is a plot showing returned rebar diameter vs probe axial position for a second test rebar arrangement.
Figure 23:
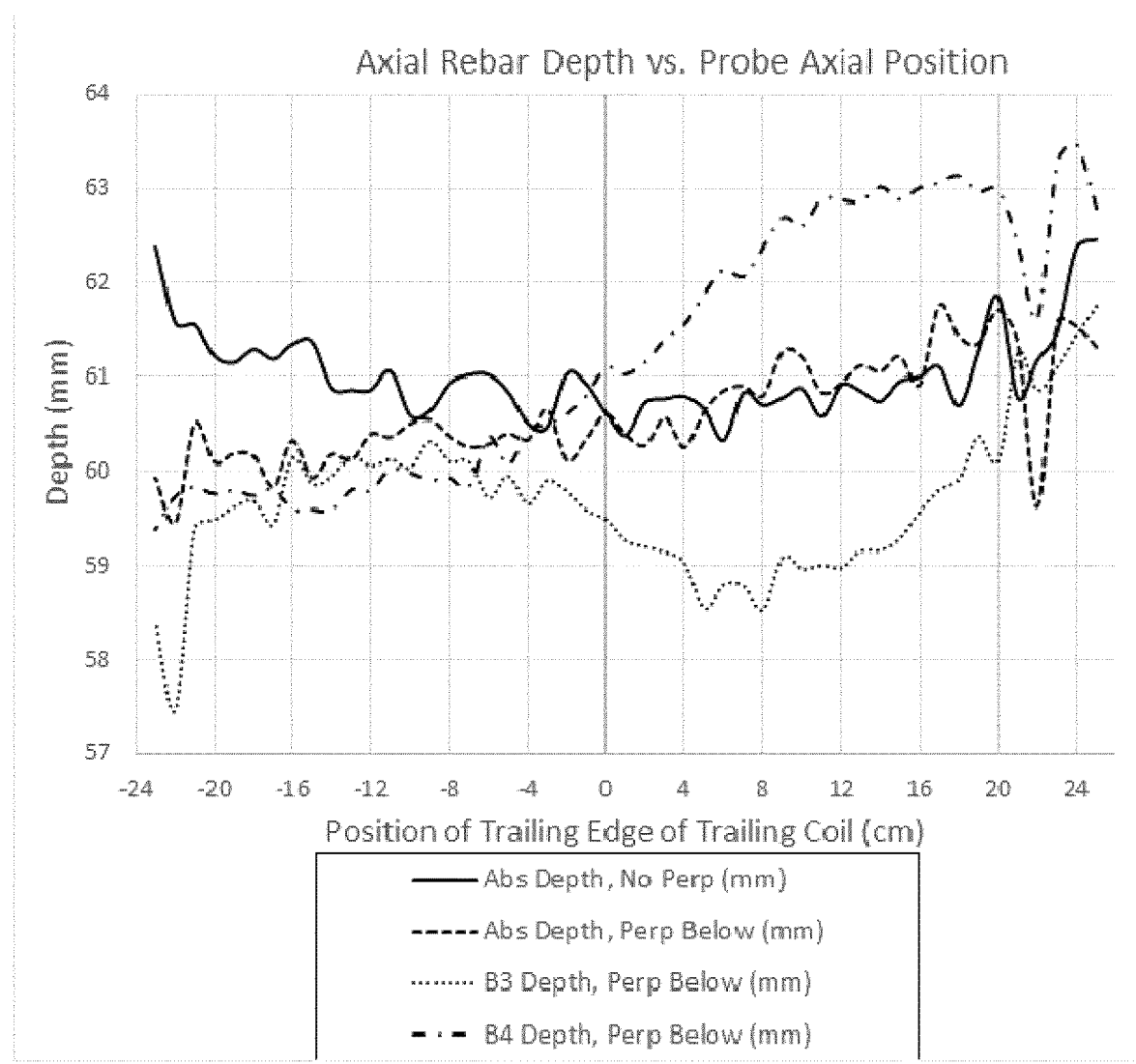
FIG. 23 is a plot showing returned rebar depth vs probe axial position for the second test rebar arrangement.

FIG. 22 is a plot illustrating experimental data returned rebar diameter from the probe scanning a rebar junction similar to that illustrated in FIG. 17b. In this example, the perpendicular rebar section (e.g. the equivalent of rebar 116 as schematically illustrated) consists of unmachined 11 mm rebar below the axial section at axial location 0 cm. Channels B3 and B4 denote the measurements obtained with the probe in the first and second solenoid modes, while the Abs channels indicate measurements obtained with the probe operating in the full transmit-receive mode as described. Similarly, FIG. 23 is a plot showing experimental date for a returned cover depth from the probe scanning the rebar junction arranged similar to FIG. 17b. The perpendicular rebar section 116 in these tests consists of unmachined 11 mm rebar located below the axial section of rebar 115 at axial location 0 cm. Again, channels B3 and B4 denote the measurements obtained with the probe in the first and second solenoid modes, while the Abs channels indicate measurements obtained with the probe operating in the full transmit-receive mode as described.

From observing these experimental results, the person skilled in the art can hence infer the relative depths and positions of multiple rebar sections in a complex structure of multiple rebar junctions or overlaid intersections.

Having demonstrated that the probes described herein can be used to locate the intersection of two rebars (or other suitable target objects), the teachings herein can also relate to a method of locating the intersection of two elongate, magnetic target objects (such as rebars) within a non-magnetic structure or surrounding matrix material.

As referred to herein, the diffusion time constant can be computed by observing the voltage of the signal response. The diffusion time constant can then be used to compute the radius of the uncorroded rebar that is encased in a halo of corrosion products. This results from the fact that a pulsed Eddy current signal will exponentially decay over time. In the case of a cylindrical scatterer such as rebar, this diffusion time constant $\tau$ for the decay of this signal is given as:

$$\tau \propto \mu \sigma R^2$$

The diffusion time constant and thus the voltage signal response of the pulsed eddy current will therefore be directly related by the radius R of the uncorroded rebar that is encased in a halo of corrosion products, the product of the conductivity $\sigma$ and permeability $\mu$ of the uncorroded steel. The presence of corrosion products will generally have a relatively small impact on the overall response measure by the system. This may be because their relative permeability and conductivity is much smaller than uncorroded steel rebar.

Figure 8:
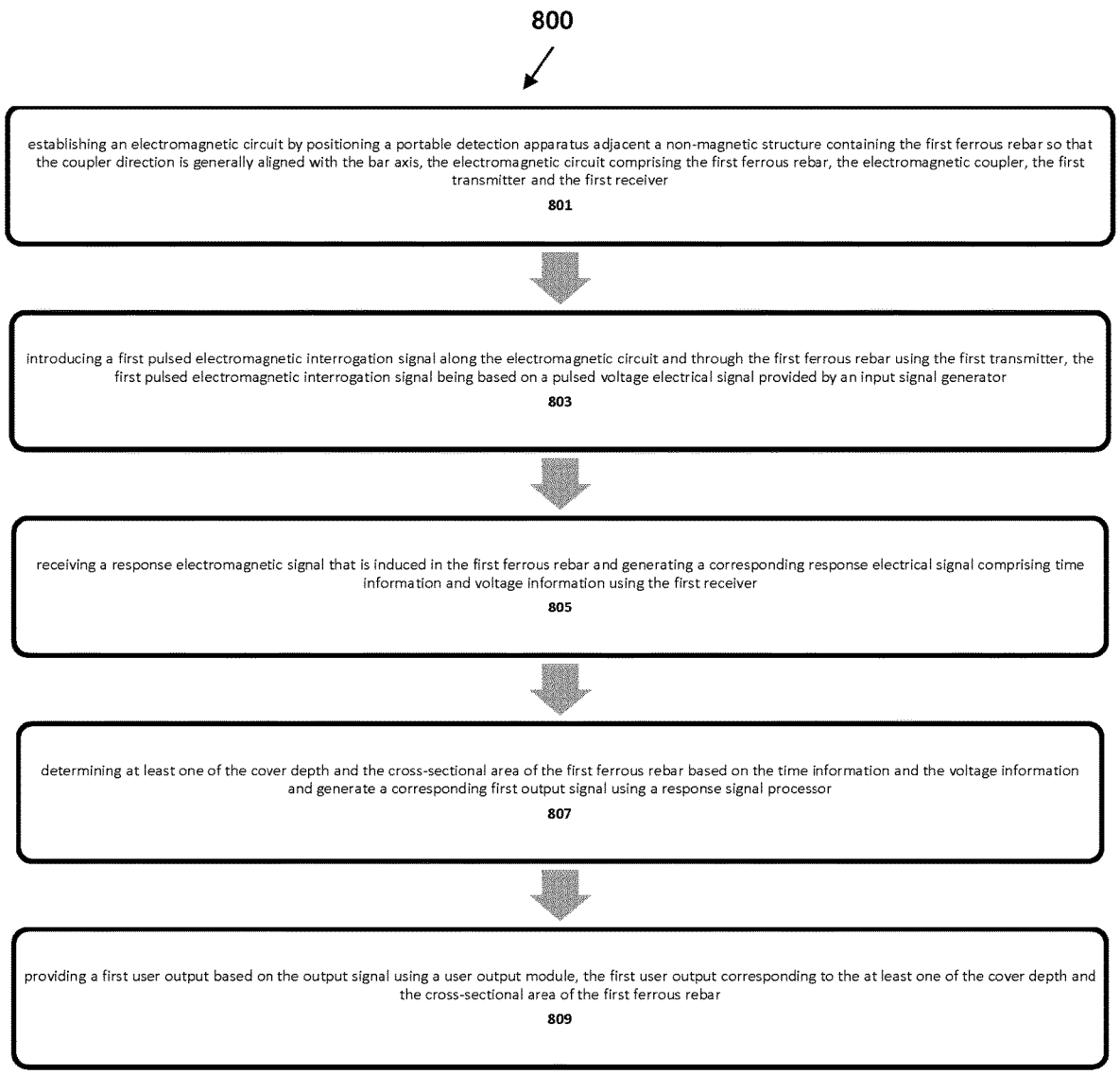
FIG. 8 illustrates an example of a method of operating the pulsed eddy current probe.

FIG. 8 illustrates one embodiment of a non-destructive method for determining at least one of a cover depth and a cross-sectional area of at least a first ferrous rebar that is within a non-magnetic structure and extends along a bar axis using a portable detection apparatus comprising an electromagnetic coupler extending in a coupler direction, a first transmitter and a first receiver 800. This method includes, at step 801, establishing an electromagnetic circuit by positioning a portable detection apparatus adjacent a non-magnetic structure containing the first ferrous rebar so that the coupler direction is at least generally aligned with the bar axis, the electromagnetic circuit comprising the first ferrous rebar, the electromagnetic coupler, the first transmitter and the first receiver. With the apparatus in the desired position, the method 800 can then include, at step 803, introducing a first pulsed electromagnetic interrogation signal along the electromagnetic circuit and through the first ferrous rebar using the first transmitter. The first pulsed electromagnetic interrogation signal is preferably based on a pulsed voltage electrical signal provided by an input signal generator. Having introduced the interrogation signal, the method can then move to step 805 that includes receiving a response electromagnetic signal that is induced in the first ferrous rebar and generating a corresponding response electrical signal comprising time information and voltage information using the first receiver.

Having received the response electromagnetic signal and generated the response electrical signal the method 800 can include the step, at 807, of determining at least one of the cover depth and the cross-sectional area of the first ferrous rebar based on the time information and the voltage information in the response electrical signal, and preferably then generating a corresponding first output signal using a response signal processor (as described herein). The method can then include, at step 809, providing at least a first user output based on the output signal using a user output module so that a user of the probe will be presented with information about the condition of the target object in a meaningful manner. For example, the user output can provide information that corresponds to at least one of the cover depth and the cross-sectional area of the first ferrous rebar. The user outputs may be any suitable type of output such as a light, sound, computer display, numerical value (such as a depth measurement value in mm or the like and/or a bar cross-sectional area or diameter value alert), graph, haptic feedback and the like. For example, the user outputs may provide values and/or quantitative information to the user, such as the "rebar diameter is Xmm", or may provide qualitative information, such as showing a green light if the diameter of the rebar falls within a predetermined acceptable range and showing a yellow or red light if the diameter is outside pre-determined, acceptable parameters.

When performing an inspection, it is suggested that the operator sweeps the probe when the probe is in full transmit-receive mode to detect the rebar. The probe is relatively insensitive to rebar that is perpendicular to the probe axis, and therefore the maximal signal strength that is achieved/measured when rotating the probe relative to the structure after the initial detection of a target object may be detected when the probe axis is substantially aligned with the object axis. This relation may help allow a user to identify the orientation of the buried rebar. The operator/user may then perform a raster scan in the vicinity of the rebar along the structure of the non-ferrous material. As the probe is highly insensitive to rebar perpendicular to the probe axis, this probe design allows for an accurate measurement at rebar meshes.

Figure 7:
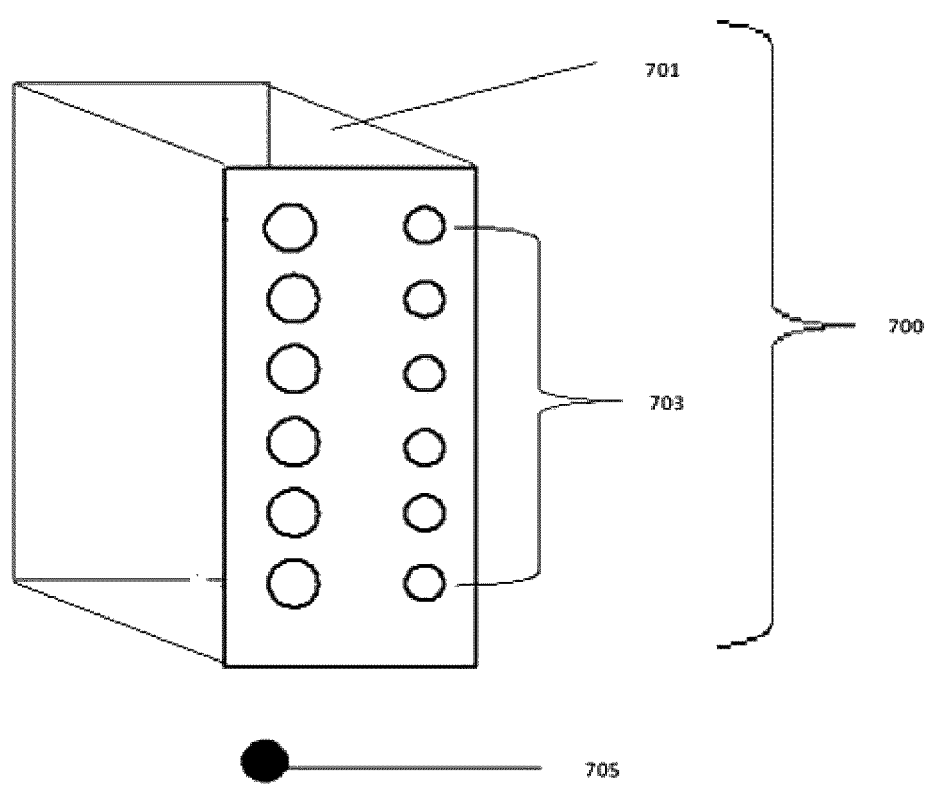
FIG. 7 illustrates an embodiment of the calibration jig.

Prior to performing an inspection, it is preferable to calibrate the instrument, and it may be necessary in some instances in order to obtain a meaningful measurement. Calibration can, in some examples, entail collecting the voltage response of the instrument/probe to a number of machined rebar samples to a known radius and at a fixed distance beneath the probe. FIG. 7 shows an example of a calibration jig 700 which can be used to calibrate the instrument/probe in this manner. In this example, calibration jig 700 includes an instrument mounting surface 701, a plurality of recesses referred to as rebar perforations 703, and a rebar sample 705.

To perform the calibration the rebar sample 705 can be placed into one of the plurality of rebar perforations 703, each of which are located at a known or measurable distance below the instrument mounting surface 701. The instrument/probe is then placed on the instrument mounting surface 701 and axially aligned with the rebar sample 705. One or more measurements can then be taken using the instrument/probe. This process can then be repeated using different rebar samples, having different diameters and/or other properties, and rebar samples can be placed in different ones of the rebar perforations 703 that are at different distances from the instrument mounting surface 701.

Figure 10:
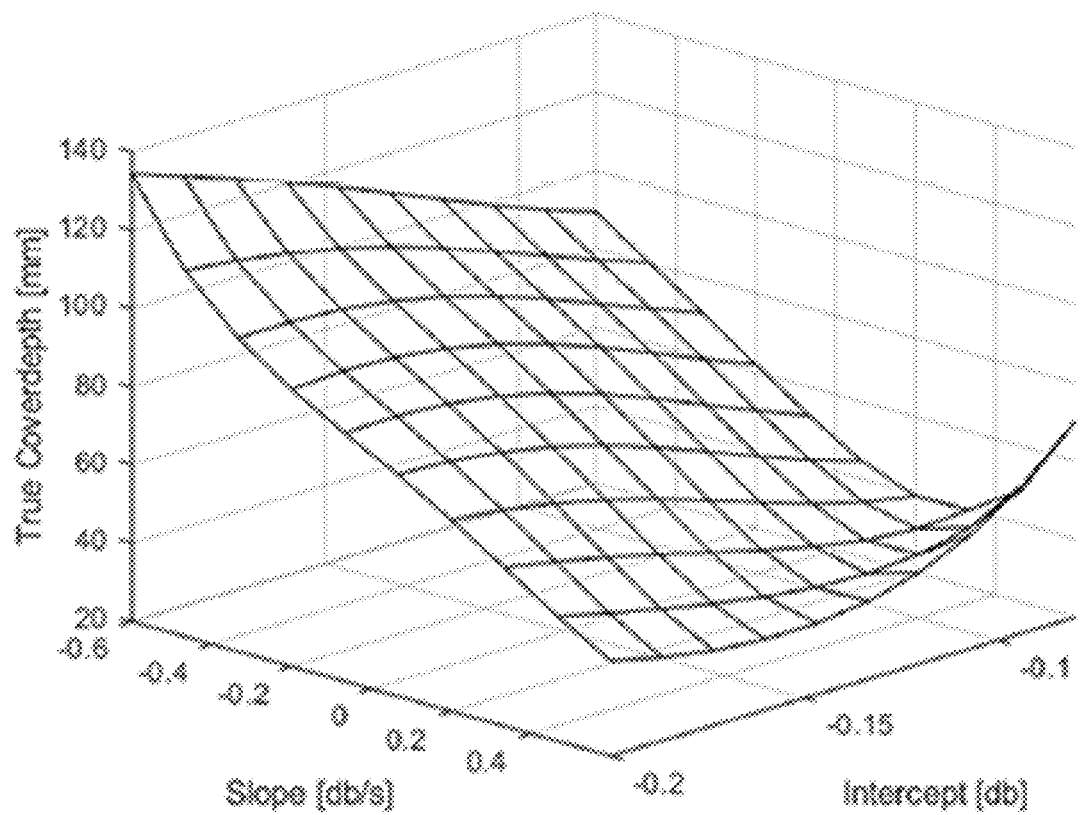
FIG. 10 illustrates one embodiment of the two-dimensional polynomial fit in which cover depth is used as the independent variable.
Figure 11:
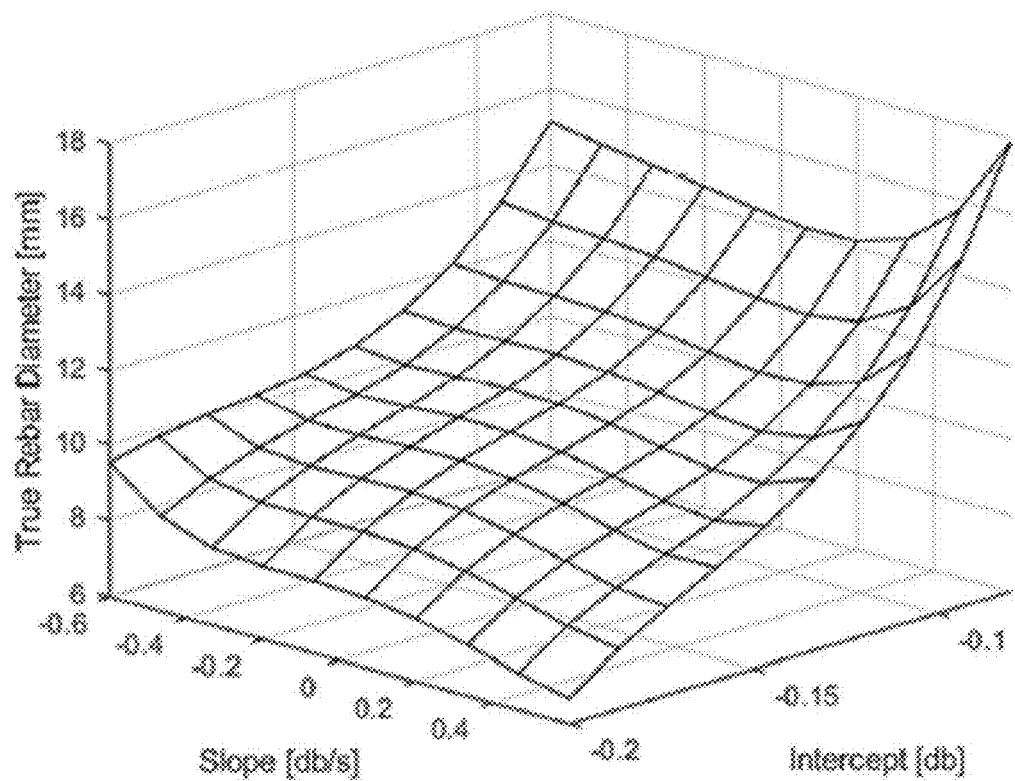
FIG. 11 illustrates one embodiment of the two-dimensional polynomial fit in which the rebar diameter is used as the independent variable.

The voltage response of the instrument/probe to the rebar sample 705 and a variety of other rebar samples of different diameters located in different ones of the rebar perforations 703, and at different cover depths is then measured to generate a calibration dataset. A two-dimensional polynomial fit can then be applied to the calibration dataset to map and/or cross-reference the time information and the voltage information contained in the dataset to the associated, known cover depth and effective diameter information. In one embodiment of the two-dimensional polynomial fit time information and voltage information are used as independent variables and either the rebar diameter or the cover depth is used as the dependent variable. FIG. 10 shows a graphical illustration of one embodiment of the two-dimensional polynomial fit in which cover depth is used as the independent variable. FIG. 11 shows a graphical illustration of one embodiment of the two-dimensional polynomial fit in which the rebar diameter is used as the independent variable. In both FIG. 10 and Figure 1lthe time information and voltage information has been used to compute a signal slope and y-intercept (the vertical offset alluded to in FIG. 5) which are displayed in the figures.

The calibration dataset can then be fed into or otherwise accessed by an information processing unit 121 (FIG. 1) which is communicatively coupled to the receive coils 103 and 107. The information processing unit 121 utilizes the calibration dataset to generate the cover depth and rebar diameter based on both the calibration dataset and the voltage of the response received at receive coils 103 and 107. One example of the information processing unit 121 is a general purpose computer in conjunction with a data acquisition device (to interface the raw voltages from the probe into a format that can be read by a computer) to record the receive coil voltages, many other such information processing units may be used consistent with the spirit of the invention.

Figure 9:
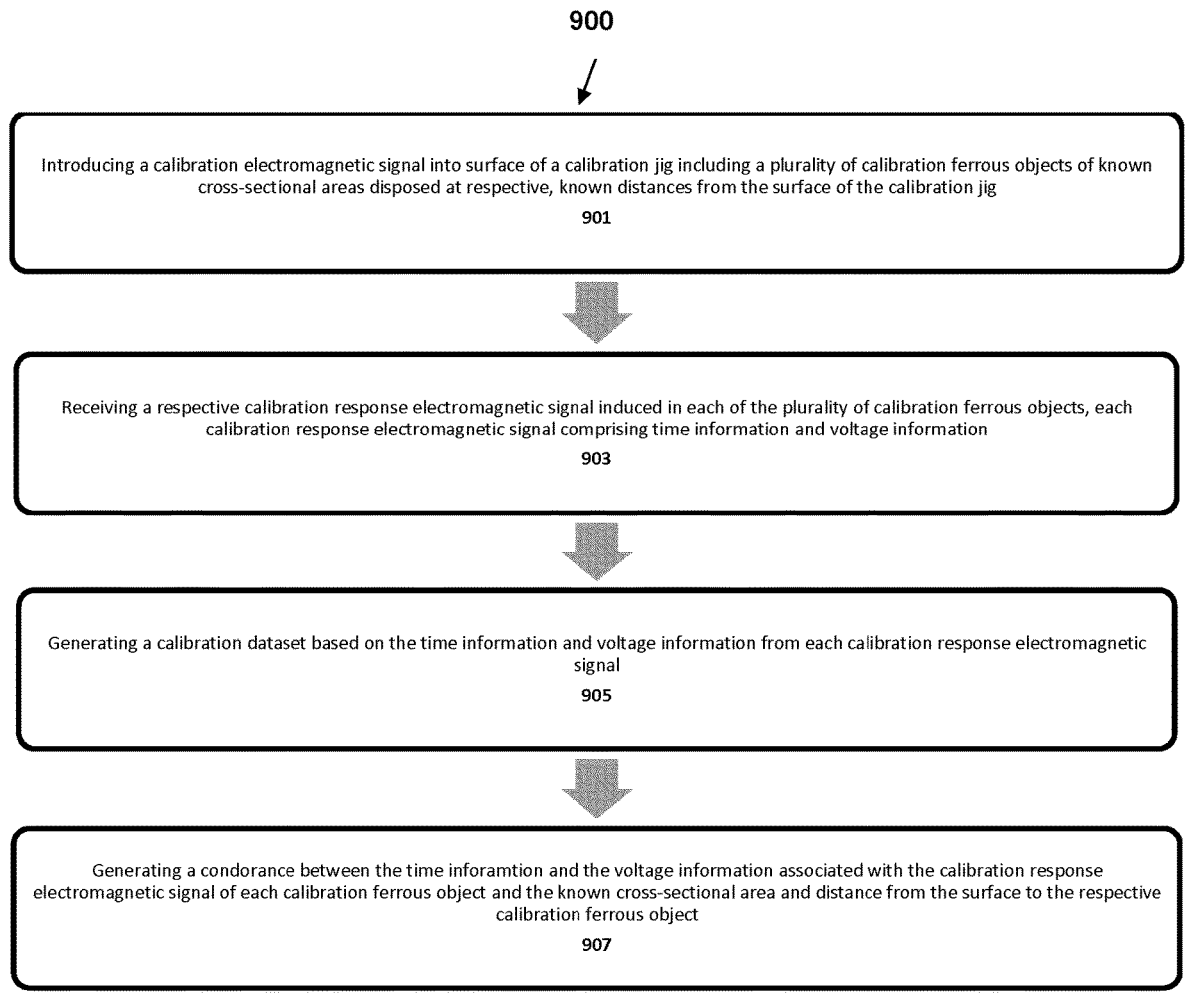
FIG. 9 illustrates an example of a method of calibrating the pulsed eddy current probe.

FIG. 9 illustrates one example of a calibration process 900. The calibration process includes, at step 901 introducing a calibration electromagnetic signal into surface of a calibration jig (such as jig 700) including a plurality of calibration ferrous objects (such as objects 705) of known cross-sectional areas disposed at respective, known distances from the surface (such as surface 701) of the calibration jig. At step 903, the method can then include receiving a respective calibration response electromagnetic signal induced in each of the plurality of calibration ferrous objects, each calibration response electromagnetic signal can include time information and voltage information. At step 905, the method can then include generating a calibration dataset based on the time information and voltage information from each calibration response electromagnetic signal. Based on the calibration dataset, the method can include, at step 097, generating a concordance between the time information and voltage information associated with the calibration response electromagnetic signal of each calibration ferrous object and the known cross-sectional area and distance from the surface to the respective calibration ferrous object. This information can then be used as a reference and measurements taken in the field can be compared to the values that are determined and recorded via the calibration process as part of the process for calculating the rebar size and cover depth measurements. Jigs can be formed from different materials and/or different sizes and types of rebar can be used to obtain similar calibration datasets for different types of structures. Optionally, different calibration datasets, and associated concordance data, can be utilized when the probes are in use, based on the type or composition of the structure that is being inspected.

Figure 12:
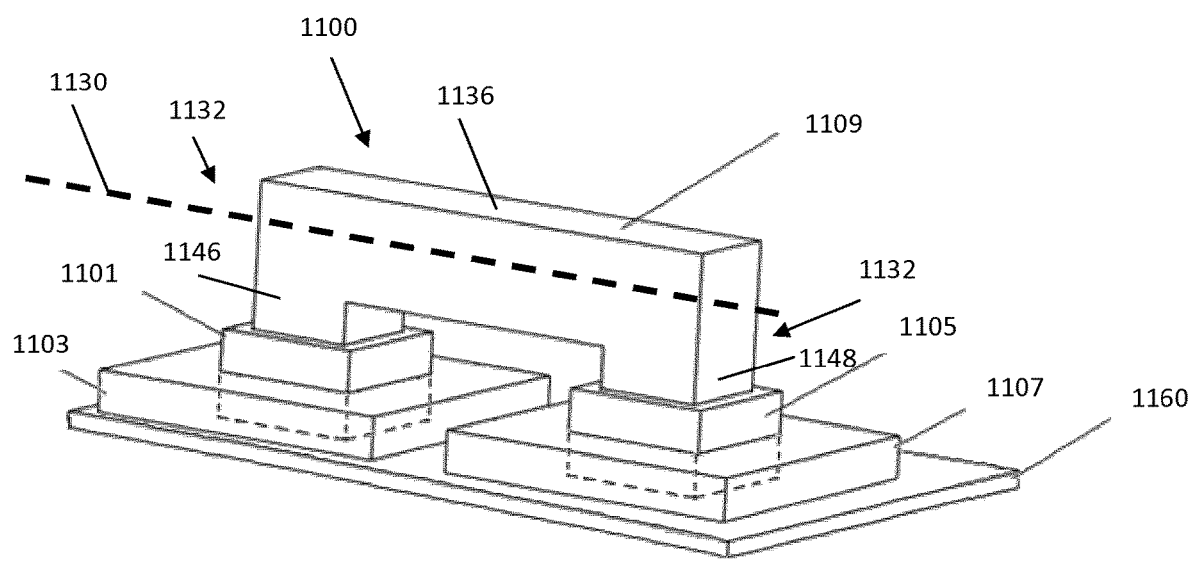
FIG. 12 is a schematic representation of another embodiment of a deep electromagnetic rebar probe.

FIG. 12 illustrates another embodiment of the deep electromagnetic rebar probe 1100. The probe 1100 is analogous to probe 100, and like features are identified using like reference characters indexed by 1100. Here, the ferromagnetic yoke 1109 completes a magnetic circuit between transmit coils 1101 and 1105, receive coils 1103 and 1107 and a ferromagnetic sample buried within a non-ferrous material. In this example, the transmit coils 1101 and 1105, receive coils 1105 and 1107 are illustrated schematically as rectangular blocks, but it is understood that they can include coiled wire and other fasteners, connectors and the like.

In this illustrated embodiment, transmit coils 1101 and 1105, receive coils 1103 and 1107, and ferromagnetic yoke 1109 each have a substantially rectangular cross sectional geometry. In other embodiments of the a deep electromagnetic rebar probe the associated transmit coils, receive coils, and/or ferromagnetic yoke may have a different cross-sectional shape and may include, for example, a circular or elliptical cross sectional geometry. In general, the shape of the cross sectional area is arbitrary and may be configured differently in different embodiments of the teachings described herein.

In the embodiment illustrated in FIG. 12, a wear plate 1160 is provided and is positioned to physically abut the transmit coils 1101 and 1105, and the receive coils 1103 and 1107. The wear plate 1160 is intended to protect the coils physical damage or other harm, such as from being placed into direct contact with the relatively the rough surface of a concreate structure that is being inspected. While shown as a single, continuous plate in the this example, in other examples the wear plate may include two or more separate pieces, such as having one pieced located at each end of the yoke 1109.

Preferentially, if a wear plate such as plate 1160 is used the transmit coils 1101 and 1105 and the receive coils 1103 and 1107 are configured to extend to the surface of the wear plate 1160 as this may enhance the sensitivity of the measurements.

An alternative, and possibly less-optimal design for the probes may include placing the coils in different places along the ferromagnetic yoke 109 or 1109, rather than at the ends as shown in the illustrated embodiments.

In the illustrated embodiment the transmit coils 1101 and 1105 abut and surround the ferromagnetic yoke 1109, and the receive coils 1103 and 1107 surround the transmit coils 1103 and 1105. In this arrangement, the transmitters (e.g. the transmit coils 1101 and 1105) are partially nested within the receivers (e.g. the receive coils 1103 and 1107), as a lower portion of the transmit coils 1101 and 1105 are laterally surrounded by the receive coils 1103 and 1107. Optionally, substantially all of the transmit coils can be contained by and nested within the receive coils, for example as shown schematically in FIG. 1. Having the transmitter (e.g. transmit coils 1101 and 1105) positioned relatively close to the yoke 1109, and preferably in contact with the yoke 1109 may be preferred because it may help the ferromagnetic yoke 1109 to direct the magnetic field generated by the transmit coils 1101 and/or 1105. In other embodiments, different arrangements of the transmitters and receivers may be used, including arrangements where the transmitters are not nested within the receivers, and optionally where a receiver is at least partially nested within a transmitter.

Figure 15:
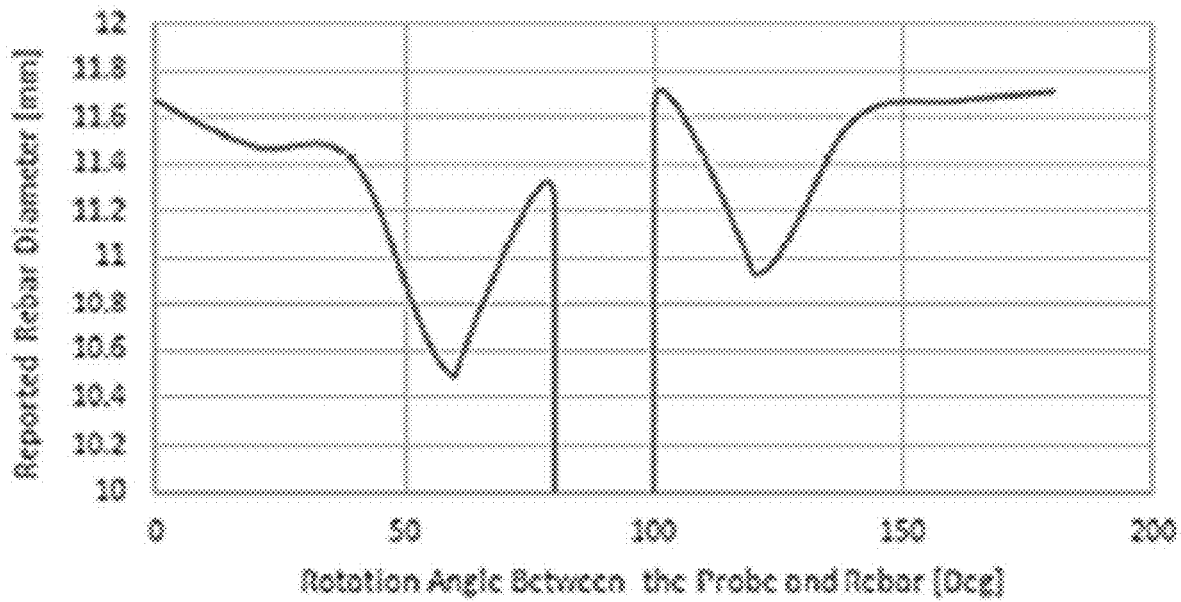
FIG. 15 illustrates a plot of the effective rebar diameter as a function of the angle between the two transmit/receive coil pairs and the rebar sample being examined.
Figure 16:
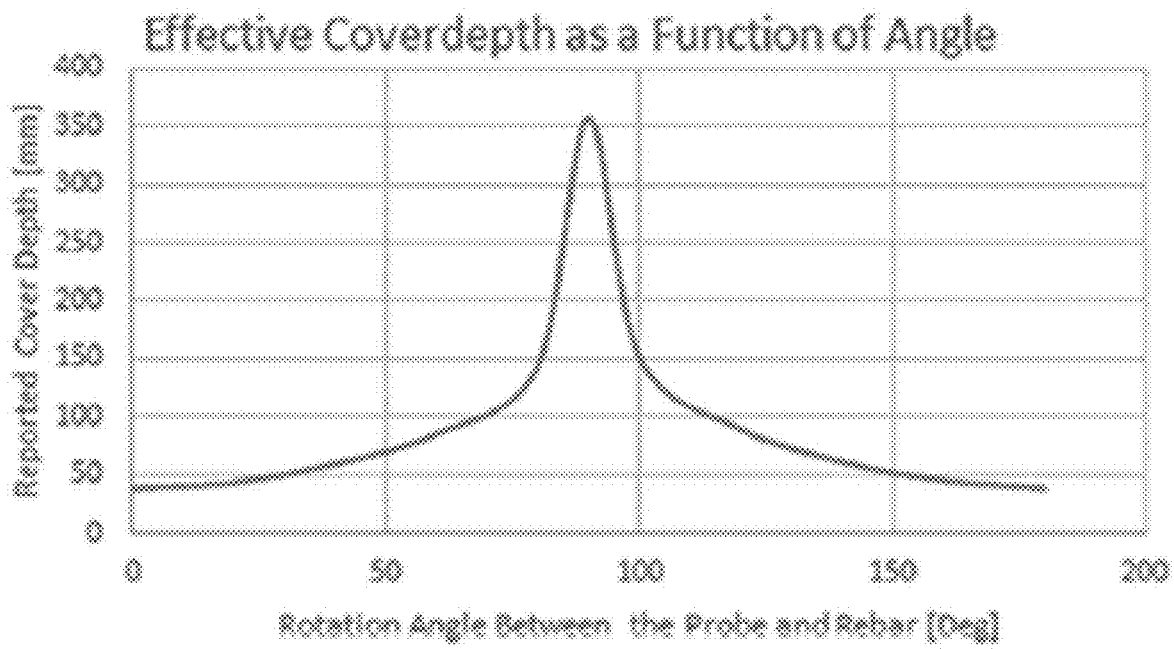
FIG. 16 illustrates a plot of the effective cover depth as a function of the angle between the two transmit/receive coil pairs and the rebar sample being examined.

Preferentially the operator of the probe will align the probe (e.g. 100 or 1100) so that the axis formed between the two transmit/receive coil pairs is at least substantially parallel to the axis of the rebar sample being examined. This may help increase the accuracy and/or reliability of the measurements. However, in practice, perfect alignment is generally not required in order to obtain measurements that are reliable enough to provide useful information to a user. For example, FIG. 15 illustrates the returned value for effective rebar diameter as a function of relative angle between the probe yoke axis 130/1130 and the rebar axis 140. In this figure a 0 and 180 degree angle represents the case where the two transmit/receive coil pairs are parallel to the axis of the rebar sample being examined and a 90 degree angle represents the case where the two transmit/receive coil pairs are perpendicular to the axis of the rebar sample being examined. As can be seen perfect alignment is not required and a reasonably accurate value is obtained with deviations up to 40 degrees from the ideal scenario of perfect alignment. Similarly FIG. 16 illustrates the returned value for effective cover depth as a function of angle. Again, reasonably accurate values can be obtained with deviations up to 40 degrees from the ideal scenario of perfect alignment.

While the teaching herein include illustrative embodiments and examples of some aspects of an invention, the description is not intended to be construed in a limiting sense. Thus, various modifications of the illustrative embodiments, as well as other embodiments of the invention, may be apparent to persons skilled in the art upon reference to this description. It is therefore contemplated that the appended claims will cover any such modifications or embodiments.

All publications, patents, and patent applications referred to herein are incorporated by reference in their entirety to the same extent as if each individual publication, patent, or patent application was specifically and individually indicated to be incorporated by reference in its entirety.

We claim:

1. A non-destructive method for determining at least one of a cover depth and a cross-sectional area of at least a first ferrous rebar that is within a non-magnetic structure and extends along a bar axis using a portable detection apparatus comprising an electromagnetic coupler extending in a coupler direction, a first transmitter and a first receiver, the method comprising:
 a) establishing an electromagnetic circuit by positioning a portable detection apparatus adjacent a non-magnetic structure containing the first ferrous rebar so that the coupler direction is generally aligned with the bar axis, the electromagnetic circuit comprising the first ferrous rebar, the electromagnetic coupler, the first transmitter and the first receiver;
 b) introducing a first pulsed electromagnetic interrogation signal along the electromagnetic circuit and through the first ferrous rebar using the first transmitter, the first pulsed electromagnetic interrogation signal being based on a pulsed voltage electrical signal provided by an input signal generator;
 c) receiving a response electromagnetic signal having first magnitude that is induced in the first ferrous rebar and generating a corresponding response electrical signal comprising time information and voltage information using the first receiver;
 d) determining at least one of the cover depth and the cross-sectional area of the first ferrous rebar based on the time information and the voltage information and generate a corresponding first output signal using a response signal processor, wherein determining the cross-sectional area comprises determining a rate of change/slope of a voltage of the response electrical signal with respect to time and comparing the rate of change to a predetermined data set, and wherein determining the cover depth comprises determining an amplitude of a logarithm of a voltage of the response electrical signal and comparing the amplitude to a predetermined data set; and
 e) providing a first user output based on the output signal using a user output module, the first user output corresponding to the at least one of the cover depth and the cross- sectional area of the first ferrous rebar.

2. The method of claim 1, further comprising positioning the portable detection apparatus so that the coupler direction is substantially parallel to the bar axis.

3. The method of claim 1, wherein the pulsed voltage electrical signal comprises a square voltage waveform.

4. The method of claim 1, wherein step 1d) includes determining both the cover depth and the cross-sectional area of the first ferrous rebar using the response signal processor.

5. The method of claim 1, wherein the first user output corresponds to the cross-sectional area of the first ferrous rebar.

6. The method of claim 1, wherein the determining the rate of change comprises determining a slope (in db/s) of a plot of the amplitude of the logarithm of the voltage of the response electrical signal (db) with respect to time(s) and comparing the slope to predetermined calibration slope values associated with corresponding rebar areas, and the determining the cross-sectional area further comprises determining an amplitude of the voltage of the response electrical signal and comparing the amplitude to the predetermined data set.

7. The method of claim 1, wherein the first user output corresponds to the cover depth of the first ferrous rebar.

8. The method of claim 1, wherein the determining the amplitude of the logarithm of a voltage of the response electrical signal comprises determining a y-intercept of a plot of the amplitude of the logarithm of the voltage of the response electrical signal (db) with respect to time(s) and comparing the y-intercept to predetermined calibration y-intercept values associated with corresponding cover depths, and wherein the determining the cover depth further comprises determining a rate of change/slope of a voltage of the response electrical signal with respect to time and comparing the rate of change to the predetermined data set.

9. The method of claim 1, further comprising:
 introducing a second pulsed electromagnetic interrogation signal along the electromagnetic circuit and through the first ferrous rebar using a second transmitter connected to the electromagnetic coupler and configured to produce the second pulsed electromagnetic interrogation signal based on the pulsed voltage electrical signal provided by the input signal generator, whereby the response electromagnetic signal has a second magnitude that is greater than the first magnitude; and
 receiving the response electromagnetic signal that is induced in the first ferrous rebar using a second receiver attached to the electromagnetic coupler and wherein the response electrical signal is based on a combination of the time information and the voltage information generated by the first receiver and time information and voltage information generated by the second receiver.

10. The method of claim 9, wherein the portable detection apparatus is selectably configurable in:
a) a first operating mode, in which only the first pulsed electromagnetic interrogation signal is introduced along the electromagnetic circuit; and
b) a second operating mode in which the first and second pulsed electromagnetic interrogation signals are introduced simultaneously along the electromagnetic circuit.

11. The method of claim 1, wherein the first transmitter is positioned at a first end of the electromagnetic coupler and the first receiver is positioned at an opposing second end of the electromagnetic coupler, and wherein step 1a) further comprises:
positioning both the first receiver and the first receiver proximate the non-magnetic structure, and
positioning a first wear plate between the first transmitter and the non-magnetic structure and wherein the first electromagnetic interrogation signal passes through the first wear plate.

12. The method of claim 1, further comprising calibrating the portable detection apparatus prior to step 1a), wherein the calibrating comprises:
a) introducing a calibration electromagnetic signal into surface of a calibration jig including a plurality of calibration ferrous objects of known cross-sectional areas disposed at respective, known distances from the surface of the calibration jig;
b) receiving a respective calibration response electromagnetic signal induced in each of the plurality of calibration ferrous objects, each calibration response electromagnetic signal comprising time information and voltage information;
c) generating a calibration dataset based on the time information and voltage information from each calibration response electromagnetic signal; and
d) generating a concordance between the time information and voltage information associated with the calibration response electromagnetic signal of each calibration ferrous object and the known cross-sectional area and distance from the surface to the respective calibration ferrous object.

13. The method of claim 12, wherein step 19d) comprises generating a two dimensional polynomial of best fit in which
a) the time information from each calibration response electromagnetic signal is a first independent variable;
b) the and voltage information from each calibration response electromagnetic signal is a second independent variable; and
c) one of the known cross-sectional area and distance from the surface to the respective calibration ferrous object is a dependent variable.

14. The method of claim 1, further comprising:
a) moving the portable detection apparatus to a different, second position relative to the non-magnetic structure in which the coupler direction is generally aligned with a second bar axis of a second ferrous rebar within the non-magnetic structure to establish a second electromagnetic circuit comprising the second ferrous rebar, the electromagnetic coupler, the first transmitter and the first receiver;
b) introducing a second pulsed electromagnetic interrogation signal along the second electromagnetic circuit and through the second ferrous rebar using the first transmitter, the second pulsed electromagnetic interrogation signal being based on the pulsed voltage electrical signal provided by the input signal generator;
c) receiving a second response electromagnetic signal that is induced in the second ferrous rebar and generating a corresponding second response electrical signal comprising time information and voltage information using the first receiver;
d) determining at least one of the cover depth and the cross-sectional area of the second ferrous rebar based on the time information and the voltage information and generate a corresponding second output signal using the response signal processor; and
e) providing a second user output based on the output signal using the user output module, the second user output corresponding to the at least one of the cover depth and the cross-sectional area of the second ferrous rebar.

15. A portable, non-destructive detection apparatus for determining at least a first attribute of an elongate, target object extending along an object axis and being disposed within a non-magnetic structure, the apparatus comprising:
a) an input signal generator configured to generate a pulsed voltage electrical signal;
b) an electromagnetic coupler extending in a coupler direction between first and second coupler ends and being positionable proximate the non-magnetic structure;
c) a first transmitter connected to electromagnetic coupler and configured to generate a first pulsed electromagnetic interrogation signal based on the pulsed voltage electrical signal;
d) a first receiver connected to electromagnetic coupler and spaced apart from the first transmitter, wherein when the first and second coupler ends are positioned adjacent the non-magnetic structure and the coupler direction is generally aligned with the object axis an electromagnetic circuit is formed comprising the target object, the electromagnetic coupler, the first transmitter and the first receiver, and wherein the first transmitter is configured to introduce the first pulsed electromagnetic interrogation signal through the non-magnetic structure and along the electromagnetic circuit and the first receiver is configured to receive a response electromagnetic signal that is induced in the target object and to generate a corresponding response electrical signal comprising time information and voltage information, wherein the first transmitter is disposed toward the first coupler end and first receiver is disposed toward the second coupler end, and wherein when the first and second coupler ends are positioned adjacent the non-magnetic structure at least one of the first transmitter and the first receiver are proximate the non-magnetic structure;
e) a response signal processor configured to process the response electrical signal to determine the first attribute of the target object based on the time information and the voltage information and generate a corresponding first output signal;
f) a user output module configured to generate a first user output based on the first output signal;
g) a second transmitter connected to electromagnetic coupler and spaced apart from the first transmitter; and h a second receiver connected to electromagnetic coupler and spaced apart from the second transmitter;

wherein when the first and second coupler ends are positioned adjacent the non-magnetic structure and the coupler direction is generally aligned with the object axis the second transmitter and second receiver at in the electromagnetic circuit, and wherein the second transmitter is configured to introduce the second pulsed electromagnetic interrogation signal through the non-magnetic structure and along the electromagnetic circuit and the second receiver is configured to receive the response electromagnetic signal that is induced in the target object and to generate a corresponding response electrical signal comprising time information and voltage information.

16. The apparatus of claim 15, wherein the second transmitter is disposed toward the second coupler end and the second receiver is disposed toward the first coupler end, and wherein when the first and second coupler ends are positioned adjacent the non-magnetic structure at least one of the second transmitter and the second receiver are proximate the non-magnetic structure.

17. The apparatus of claim 15, wherein the first transmitter is at least partially nested within the second receiver, wherein the first transmitter comprises at least one transmitter coil wrapped around the first coupler end, and wherein the second receiver comprises at least one receiver coil that laterally surrounds the at least one transmitter coil.

18. The apparatus of claim 15, wherein the portable detection apparatus is selectably configurable in:
  a) a first operating mode, in which only the first pulsed electromagnetic interrogation signal is introduced along the electromagnetic circuit; and
  b) a second operating modes in which the first and second pulsed electromagnetic interrogation signals are introduced simultaneously along the electromagnetic circuit.

19. The apparatus of claim 15, further comprising a first wear plate attached to the first end of the electromagnetic coupler for contacting the non-magnetic structure and disposed outboard of the first transmitter whereby when the apparatus is in use the first contact plate is disposed between the first transmitter and the non-magnetic structure.

20. The apparatus of claim 19, further comprising a second wear plate attached to the second end of the electromagnetic coupler for contacting the non-magnetic structure and disposed outboard of the first receiver whereby when the apparatus is in use the second contact plate is disposed between the first receiver and the non-magnetic structure.

21. A portable, non-destructive detection apparatus for determining at least a first attribute of an elongate, target object extending along an object axis and being disposed within a non-magnetic structure, the apparatus comprising:
  a) an input signal generator configured to generate a pulsed voltage electrical signal;
  b) an electromagnetic coupler extending in a coupler direction between first and second coupler ends and being positionable proximate the non-magnetic structure;
  c) a first transmitter connected to electromagnetic coupler and configured to generate a first pulsed electromagnetic interrogation signal based on the pulsed voltage electrical signal;
  d) a first receiver connected to electromagnetic coupler and spaced apart from the first transmitter, wherein when the first and second coupler ends are positioned adjacent the non-magnetic structure and the coupler direction is generally aligned with the object axis an electromagnetic circuit is formed comprising the target object, the electromagnetic coupler, the first transmitter and the first receiver, and wherein the first transmitter is configured to introduce the first pulsed electromagnetic interrogation signal through the non-magnetic structure and along the electromagnetic circuit and the first receiver is configured to receive a response electromagnetic signal that is induced in the target object and to generate a corresponding response electrical signal comprising time information and voltage information;
  e) a response signal processor configured to process the response electrical signal to determine the first attribute of the target object based on the time information and the voltage information and generate a corresponding first output signal;
  f) a user output module configured to generate a first user output based on the first output signal;
wherein the first attribute comprises one of:
  a) a representative cross-sectional area of the target object, wherein the response signal processor is configured to determine the first attribute based on a rate of change of a logarithm of a voltage of the response electrical signal with respect to time; and
  b) a representative depth of the target object from an outer surface of the non-magnetic structure, wherein the response signal processor is configured to determine the first attribute based on an amplitude of the logarithm of the voltage of the response electrical signal.

22. The apparatus of claim 21, wherein the response signal processor is configured to determine a second attribute of the target object based on the time information and the voltage information and generate a corresponding second output signal, wherein the second attribute comprises the other one of the representative cross-sectional area of the target object and the representative depth of the target object from an outer surface of the non-magnetic structure, and wherein user output module configured to generate a second user output (light, sound, display, etc.) based on the second output signal.

23. The apparatus of claim 21, wherein the electromagnetic coupler comprises a ferrite yoke extending in the coupler direction, and wherein the ferrite yoke comprises:
  a substantially linear portion extending along a linear yoke axis that is parallel to the coupler direction; and
  a first leg disposed at the first coupler end and extending transversely away from the liner portion and a second leg disposed at the second coupler end and extending transversely away from the liner portion, and wherein the first transmitter is mounted on the first leg and the first receiver is mounted on the second leg.

* * * * *